United States Patent
Hwang

(10) Patent No.: US 7,616,542 B2
(45) Date of Patent: Nov. 10, 2009

(54) OPTICAL RECORDING MEDIUM, RECORDING/REPRODUCING APPARATUS AND METHOD, INITIALIZATION METHOD, AND REINITIALIZATION METHOD

(75) Inventor: Sung-hee Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/957,618

(22) Filed: Dec. 17, 2007

(65) Prior Publication Data

US 2008/0094969 A1  Apr. 24, 2008

Related U.S. Application Data

(63) Continuation of application No. 11/062,808, filed on Feb. 23, 2005.

(30) Foreign Application Priority Data

| May 11, 2004 | (KR) | ............................... 2004-33182 |
| Jun. 11, 2004 | (KR) | ............................... 2004-42921 |
| Jun. 16, 2004 | (KR) | ............................... 2004-44514 |

(51) Int. Cl.
*G11B 7/00* (2006.01)

(52) U.S. Cl. ............... 369/47.14; 369/53.17; 369/53.37

(58) Field of Classification Search ............. 369/30.03, 369/53.15, 53.17, 53.37, 47.14
See application file for complete search history.

(56) References Cited

U.S. PATENT DOCUMENTS

| 5,687,397 A | 11/1997 | Ohmori |
| 5,737,639 A | 4/1998 | Ohmori |
| 5,825,726 A | 10/1998 | Hwang et al. |
| 5,914,917 A | 6/1999 | Bae |
| 6,038,208 A | 3/2000 | Shikunami et al. |
| 6,122,436 A | 9/2000 | Okada et al. |
| 6,128,263 A | 10/2000 | Sawada et al. |
| 6,137,769 A | 10/2000 | Sawada et al. |
| 6,160,952 A | 12/2000 | Mimura et al. |
| 6,243,343 B1 | 6/2001 | Ishimura et al. |
| 6,424,615 B1 | 7/2002 | Ishimura et al. |

(Continued)

FOREIGN PATENT DOCUMENTS

CN  1926624  12/2004

(Continued)

OTHER PUBLICATIONS

Office Action issued in corresponding Chinese Patent Application No. 200510069928.6 dated Mar. 21, 2008.

(Continued)

*Primary Examiner*—Wayne R Young
*Assistant Examiner*—Brenda Bernardi
(74) *Attorney, Agent, or Firm*—Stein McEwen, LLP

(57) ABSTRACT

A recording/reproducing apparatus includes a writing/reading unit writing data to or reading data from an information recording medium having an access control area in which access control data is recorded, the access control data having common information set to allow the recording/reproducing apparatus that cannot recognize a predetermined function adapted to the information recording medium to control access to the information recording medium; and a control unit controlling the writing/reading unit to record access control data regarding a function recognizable by the recording/reproducing apparatus in the access control area when the information recording medium is initialized or reinitialized.

15 Claims, 23 Drawing Sheets

U.S. PATENT DOCUMENTS

| | | | |
|---|---|---|---|
| 6,459,666 B1 | 10/2002 | Yokoi | |
| 6,469,963 B1 | 10/2002 | Sawada et al. | |
| 6,580,684 B2 | 6/2003 | Miyake et al. | |
| 6,646,965 B1 | 11/2003 | Kim | |
| 6,671,249 B2 | 12/2003 | Horie | |
| 6,678,236 B1 | 1/2004 | Ueki | |
| 6,785,196 B2 | 8/2004 | Bakx et al. | |
| 6,868,054 B1* | 3/2005 | Ko | 369/59.25 |
| 6,934,236 B2* | 8/2005 | Lee et al. | 369/59.11 |
| 7,009,926 B2* | 3/2006 | Lee | 369/59.11 |
| 7,142,493 B2* | 11/2006 | Ko | 369/53.11 |
| 7,433,287 B2* | 10/2008 | Lee | 369/59.11 |
| 7,496,005 B2 | 2/2009 | Park | |
| 2002/0006084 A1 | 1/2002 | Kawashima et al. | |
| 2002/0181376 A1 | 12/2002 | Acker | |
| 2003/0012088 A1 | 1/2003 | Bakx et al. | |
| 2003/0063540 A1 | 4/2003 | Kato et al. | |
| 2003/0067859 A1 | 4/2003 | Weijenbergh et al. | |
| 2003/0086345 A1 | 5/2003 | Ueki | |
| 2003/0090981 A1 | 5/2003 | Yokoi | |
| 2005/0195716 A1 | 9/2005 | Ko et al. | |
| 2005/0207294 A1* | 9/2005 | Park | 369/47.22 |
| 2005/0207318 A1* | 9/2005 | Park | 369/124.07 |
| 2005/0207319 A1* | 9/2005 | Park | 369/124.07 |
| 2005/0207320 A1* | 9/2005 | Park | 369/124.07 |
| 2005/0210362 A1* | 9/2005 | Park | 714/763 |
| 2005/0259560 A1* | 11/2005 | Park | 369/275.3 |
| 2005/0281167 A1* | 12/2005 | Park | 369/59.25 |
| 2007/0226234 A1 | 9/2007 | Park | |
| 2007/0291627 A1* | 12/2007 | Park | 369/275.3 |
| 2008/0049588 A1* | 2/2008 | Park | 369/124.07 |

FOREIGN PATENT DOCUMENTS

| | | |
|---|---|---|
| EP | 1 049 089 | 11/2000 |
| JP | 2-278439 | 11/1990 |
| JP | 8-328933 | 12/1996 |
| WO | WO 2005/091292 | 9/2005 |

OTHER PUBLICATIONS

DRX-510 UL, High Performance External Dual RW DVD/CD Recording for Microsoft Windows Operating Systems (Sony Electronics Inc. 2003).

DRU-510A High Performance Dual RW DVD/CD Recorder for Microsoft Windows 98SE, Windows Millennium Edition, Windows 2000, and Windows XP Operating Systems (Sony Electronics Inc. 2003).

U.S. Appl. No. 11/062,808, filed Feb. 23, 2005, Hwang et al., Samsung Electronics Co., Ltd.

U.S. Appl. No. 11/062,669, filed Feb. 23, 2005, Hwang et al., Samsung Electronics Co., Ltd.

U.S. Appl. No. 10/630,965, filed Jul. 31, 2003, Lee et al., Samsung Electronics Co., Ltd.

U.S. Appl. No. 10/630,927, filed Jul. 31, 2003, Lee et al., Samsung Electronics Co., Ltd.

U.S. Appl. No. 10/630,774, filed Jul. 31, 2003, Lee et al., Samsung Electronics Co., Ltd.

"Date Interchange on 120 mm Optical Disk Using +RW Format—Capacity: 3,0 Gbytes and 6,0 Gbytes." *Standard ECMA-274*, $2^{nd}$ Edition. Jun. 1999. ECMA International.

"120 mm (4,7 Gbytes per side) and 80 mm (1,46 Gbytes per side) DVD Rewritable Disk (DVD-RAM)." *Standard ECMA-330*, $2^{nd}$ Edition. Jun. 2002. ECMA International.

"Data Interchange on 120 mm and 80 mm Optical Disk Using +RW Format—Capacity: 4,7 and 1.46 Gbytes per Side (Recording Speed Up to 4X)." *Standard ECMA-337*, $2^{nd}$ Edition. Dec. 2003. ECMA International.

Substantive Examination Adverse Report issued on May 29, 2009, in related Malaysian Patent Application No. PI20051691.

Search Report issued on Jun. 23, 2009, in related European Patent Application No. 05252775.1.

\* cited by examiner

FIG. 13

| b1 | b0 |
|---|---|
| ACD BLOCK STATE INFORMATION ||
| 0 | 0 |
| 0 | 1 |
| 1 | 0 |
| 1 | 1 |

FIG. 14A

| | | |
|---|---|---|
| ACD BLOCK #1 | VALID | |
| ACD BLOCK #2 | DEFECTIVE | |
| ACD BLOCK #3 | VALID | ACA |
| ACD BLOCK #4 | NONE OR ACD_ID = "00" or "FF" | |
| ACD BLOCK #5 | VALID (DEFECT-WHILE-REPRODUCTION) | |
| ⋮ | ⋮ | |

FIG. 15A

| ACD BLOCK #1 | ACD_ID = "00" or "FF" |
|---|---|
| ACD BLOCK #2 | DEFECTIVE |
| ACD BLOCK #3 | ACD_ID = "00" or "FF" |
| ACD BLOCK #4 | NONE OR ACD_ID = "00" or "FF" |
| ACD BLOCK #5 | ACD_ID = "00" or "FF" |
| ⋮ | ⋮ |

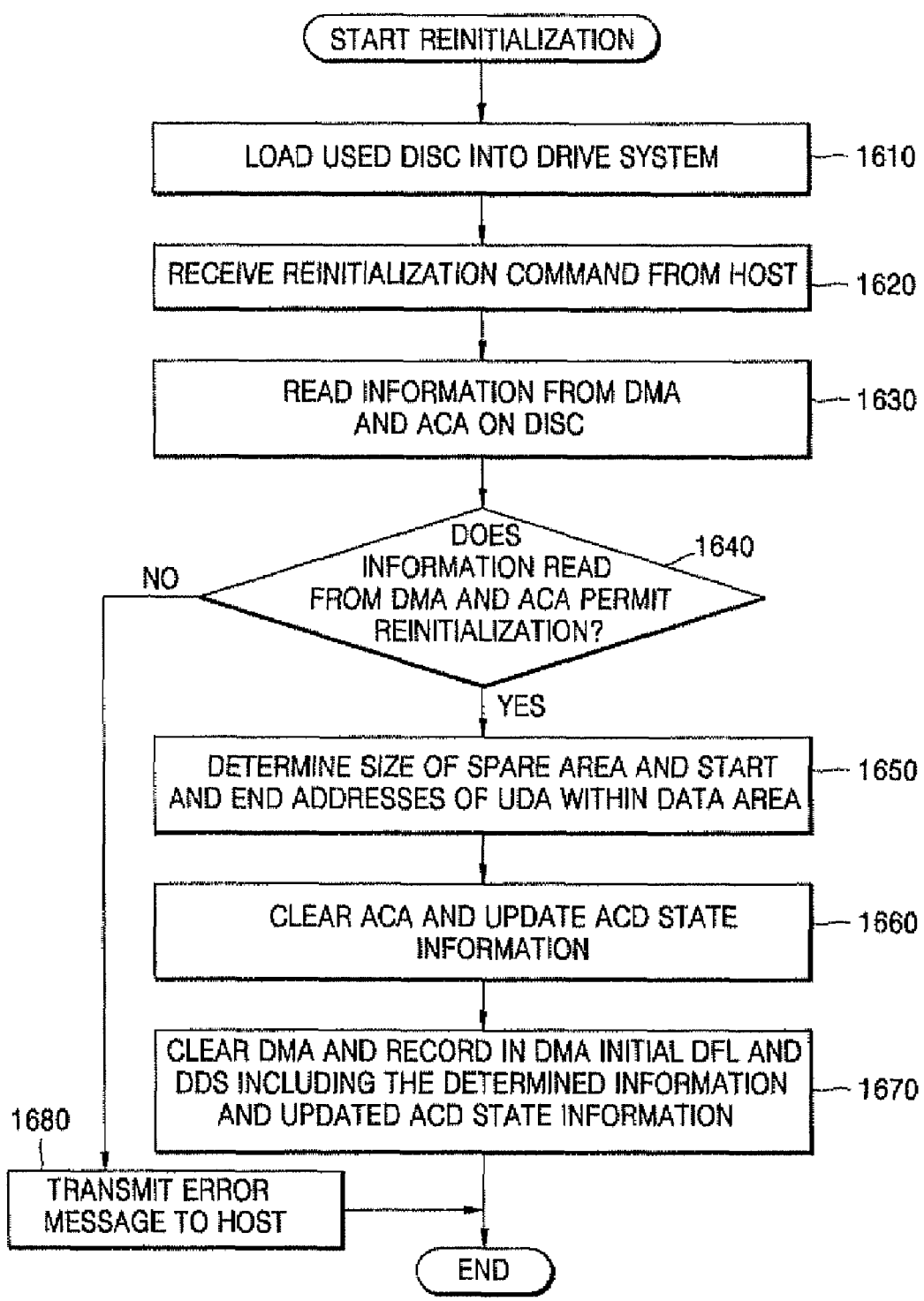

OPTICAL RECORDING MEDIUM, RECORDING/REPRODUCING APPARATUS AND METHOD, INITIALIZATION METHOD, AND REINITIALIZATION METHOD

CROSS-REFERENCE TO RELATED APPLICATIONS

This application is a continuation of U.S. patent application Ser. No. 11/062,808, filed Feb. 23, 2005, currently pending, which claims the benefit of Korean Patent Application No. 10-2004-0033182, filed on May 11, 2004 in the Korean Intellectual Property Office, Korean Patent Application No. 10-2004-0042921, filed on Jun. 11, 2004 in the Korean Intellectual Property Office, and Korean Patent Application No. 10-2004-0044514, filed on Jun. 16, 2004 in the Korean Intellectual Property Office, the disclosures of which are incorporated herein in their entireties by reference.

BACKGROUND OF THE INVENTION

1. Field of the Invention

The present invention relates to a disc, and more particularly, to an information recording medium, a recording/reproducing apparatus and method, an initialization method, and a reinitialization method, by which a disc is initialized to secure recording/reproduction compatibility.

2. Description of the Related Art

The standards for optical systems including optical disc drive systems and optical discs have to be frequently updated in light of the developments of optical disc technology and semiconductor technology. FIG. 1 is a diagram for explaining problems related to standard updating. Generally, a new standard is obtained by adding new functions to an old standard. An old standard disc 12 is designed to operate in an old standard drive system 11, whereas a new standard disc 14 is designed to operate in a new standard drive system 13.

The old standard and the new standard may or may not provide recording/reproducing compatibility. If the recording/reproducing compatibility is assured, the old standard disc 12 and the new standard disc 14 can be recorded/reproduced in both of the old and new standard drive systems 11 and 13. For example, when the new standard disc 14 is loaded into the old standard drive system 11, the old standard drive system 11 should properly operate in response to newly added functions in the new standard. Therefore, the standard should be designed by considering the necessity of updating them continuously.

In view of this need, it is necessary to define rules that allow a drive system to perform functions recognized by a current standard and rules that allow the same drive system to perform new functions not recognized by the current standard. In a case where a future standard is made by adding a new function to a current standard, if a future standard drive system stores on a disc information regarding operations that a current standard drive system needs to perform for the new function, the current standard drive system can read the information from the disc adapted to the new function and perform the operations for the new function.

In such aspect, a method of initializing or reinitializing a disc to enable various types of drive systems to use a disc adapted to a function that is not recognizable by the drive systems desired. Initialization is a process performed on an empty disc to initially use the empty disc. Reinitialization is a process performed on a used disc to initialize the used disc again.

SUMMARY OF THE INVENTION

Aspects of the present invention provide an optical recording medium, a recording/reproducing apparatus and method, an initialization method, and a reinitialization method, which increase compatibility between discs and drive systems of different standards.

According to an aspect of the present invention, there is provided an information recording medium including an access control area in which access control data is recorded, the access control data having common information set to allow a recording/reproducing apparatus that cannot recognize a predetermined function adapted to the information recording medium to control access to the information recording medium, wherein access control data regarding a function recognizable by the recording/reproducing apparatus is recorded in the access control area when the information recording medium is initialized or reinitialized.

According to an aspect of the present invention, common information of the access control data regarding the recognizable function includes an ID of the recognizable function, formatability information regarding the information recording medium, and recordability/reproducibility information regarding sub-areas defined on the information recording medium.

According to an aspect of the present invention, the formatability information and the recordability/reproducibility information is set as "formatable" and "recordable", respectively.

According to an aspect of the present invention, after the access control data is recorded, an area remaining unrecorded in the access control area is filled with a predetermined value.

According to another aspect of the present invention, there is provided a recording/reproducing apparatus including a writing/reading unit writing data to or reading data from an information recording medium having an access control area in which access control data is recorded, the access control data having common information set to allow the recording/reproducing apparatus that cannot recognize a predetermined function adapted to the information recording medium to control access to the information recording medium; and a control unit controlling the writing/reading unit to record the access control data regarding a function recognizable by the recording/reproducing apparatus in the access control area when the information recording medium is initialized or reinitialized.

According to still another aspect of the present invention, there is provided a recording/reproducing method including recording access control data regarding a function recognizable by a recording/reproducing apparatus in an access control area when an information recording medium is initialized or reinitialized to enable the information recording medium to be used, the information recording medium having the access control area in which access control data is recorded, the access control data having common information set to allow any recording/reproducing apparatus that cannot recognize a predetermined function adapted to the information recording medium to control access to the information recording medium.

According to yet another aspect of the present invention, there is provided a method of initializing an information recording medium, including recording initialization information for defect management and disc management in a defect management area arranged on the information recording medium to manage a defect occurring in a data area arranged on the information recording medium; and recording access control data regarding a function recognizable by a recording/reproducing apparatus in an access control area arranged on the information recording medium, the access control data having common information set to allow any recording/reproducing apparatus that cannot recognize a predetermined function adapted to the information recording medium to control access to the information recording medium.

According to an aspect of the present invention, the initialization information includes a disc definition structure (DDS) including assignment information regarding a spare area, which is assigned in the data area to record data replacing defective data occurring in the data area, and assignment information regarding a user data area in which user data is recorded in the data area; and a defect list (DFL) including initial information for defect management.

According to a further aspect of the present invention, there is provided a method of reinitializing an information recording medium, including determining whether the information recording medium can be reinitialized using initialization information recorded in a defect management area arranged on the information recording medium for defect management and disc management and using access control data recorded in an access control area arranged on the information recording medium, the access control data having common information set to allow any recording/reproducing apparatus that cannot recognize a predetermined function adapted to the information recording medium to control access to the information recording medium; if it is determined that the information recording medium can be reinitialized, updating the initialization information with reinitialization information in the defect management area; and clearing the access control area and recording access control data regarding a function recognizable by the recording/reproducing apparatus in the access control area.

According to an aspect of the present invention, the reinitialization information includes a DDS including assignment information regarding a spare area, which is assigned in the data area to record data replacing defective data occurring in the data area, and assignment information regarding a user data area in which user data is recorded in the data area; and a DFL including initial information for defect management.

According to an aspect of the present invention, the method further includes determining a size of the spare area as the assignment information regarding the spare area and determining a start address and an end address of the user data area as the assignment information regarding the user data area.

According to another aspect of the present invention, there is provided a recording/reproducing apparatus including a writing/reading unit writing data to or reading data from an information recording medium having an access control area, in which access control data (ACD) is recorded, and an ACD state information area in which state information regarding one of defectiveness and recordability of an ACD block containing the ACD is recorded, the ACD having common information set to allow the recording/reproducing apparatus that cannot recognize a predetermined function adapted to the information recording medium to control access to the information recording medium; and a control unit controlling the writing/reading unit to change the state information regarding the ACD block when the information recording medium is reinitialized.

According to an aspect of the present invention, the control unit changes state information indicating that ACD block has valid ACD into state information indicating that the ACD block has invalid ACD and is available for recording of ACD when the information recording medium is reinitialized.

According to an aspect of the present invention, the control unit does not change state information indicating that the ACD block is a defective block and state information indicating that the ACD block is available for recording of ACD when the information recording medium is reinitialized.

According to an aspect of the present invention, the control unit changes state information indicating that the ACD block has valid ACD and a defect-while-reproduction into state information indicating that the ACD block is a defective block when the information recording medium is reinitialized.

According to an aspect of the present invention, the control unit controls the writing/reading unit to write one of "00h" and "FFh" as an ID of the ACD to indicate validity of the ACD block included in the access control area when the information recording medium is reinitialized.

According to an aspect of the present invention, the control unit controls the writing/reading unit to read data from the ACD block based on the state information regarding the ACD block when the validity of the ACD block indicated by the ID of the ACD is inconsistent with the state information regarding the ACD block.

According to an aspect of the present invention, when an error occurs while the state information regarding the ACD block is reproduced, the control unit determines the validity of the ACD block based on the ID of the ACD.

According to still another aspect of the present invention, there is provided a recording/reproducing method including writing data to or reading data from an information recording medium having an access control area, in which ACD is recorded, and an ACD state information area in which state information regarding one of defectiveness and recordability of an ACD block containing the ACD is recorded, the ACD having common information set to allow the recording/reproducing apparatus that cannot recognize a predetermined function adapted to the information recording medium to control access to the information recording medium; and changing the state information regarding the ACD block when the information recording medium is reinitialized.

According to yet another aspect of the present invention, there is provided a recording/reproducing apparatus including a writing/reading unit writing data to or reading data from an information recording medium having an access control area in which ACD is recorded, the ACD having common information set to allow the recording/reproducing apparatus that cannot recognize a predetermined function adapted to the information recording medium to control access to the information recording medium; and a control unit controlling the writing/reading unit to write default ACD in the access control area when the information recording medium is initialized or reinitialized, the default ACD including common information set to permit writing/reading with respect to sub-areas defined on the information recording medium and predetermined specific information.

According to an aspect of the present invention, the at least part of values set for the default ACD is provided by at least one of a host and the control unit.

According to a further aspect of the present invention, there is provided a recording/reproducing apparatus including a writing/reading unit writing data to or reading data from an information recording medium having an access control area in which ACD is recorded, the ACD having common information set to allow the recording/reproducing apparatus that cannot recognize a predetermined function adapted to the information recording medium to control access to the information recording medium; and a control unit controlling the writing/reading unit to write at least default ACD among ACD regarding functions recognizable by the recording/reproducing apparatus in the access control area, when the information recording medium is initialized or reinitialized, the default ACD including common information set to permit writing/reading with respect to sub-areas defined on the information recording medium and predetermined specific information.

According to another aspect of the present invention, there is provided a recording/reproducing apparatus including a writing/reading unit writing data to or reading data from an information recording medium having an access control area in which ACD is recorded, the ACD having common information set to allow the recording/reproducing apparatus that cannot recognize a predetermined function adapted to the information recording medium to control access to the information recording medium; and a control unit controlling the writing/reading unit to change data in an ACD block regarding a function recognizable by the recording/reproducing apparatus and record a value indicating "available" in an ACD block regarding a function unrecognizable by the recording/reproducing apparatus, among ACD blocks in the access control area, when the information recording medium is reinitialized.

According to an aspect of the present invention, the control unit controls the writing/reading unit to change or erase the data in the ACD block regarding the recognizable function or to add a new ACD block regarding a new recognizable function according to a user's request and to update state information regarding the ACD block regarding the recognizable function according to a result of one of the change, erasure, and addition.

According to an aspect of the present invention, the ACD block regarding the new recognizable function includes a default ACD that has common information set to permit writing/reading with respect to sub-areas defined on the information recording medium and predetermined specific information.

According to an aspect of the present invention, the control unit controls the writing/reading unit to write one of "00h" and "FFh" in the ACD block regarding the unrecognizable function to indicate that the ACD block regarding the unrecognizable function does not have valid data and to change state information regarding the ACD block regarding the unrecognizable function to indicate that the ACD block regarding the unrecognizable function is available.

According to still another aspect of the present invention, there is provided a recording/reproducing method including recording default ACD in an access control area when an information recording medium is initialized or reinitialized, wherein the access control area is provided in the information recording medium to record ACD therein, the ACD having common information set to allow the recording/reproducing apparatus that cannot recognize a predetermined function adapted to the information recording medium to control access to the information recording medium, and wherein the default ACD includes common information set to permit writing/reading with respect to sub-areas defined on the information recording medium and predetermined specific information.

According to yet another aspect of the present invention, there is provided a recording/reproducing method including recording in an access control area at least default ACD among ACD regarding functions recognizable by a recording/reproducing apparatus when recording/reproducing apparatus initializes or reinitializes an information recording medium, wherein the access control area is provided in the information recording medium to record ACD therein, the ACD having common information set to allow the recording/reproducing apparatus that cannot recognize a predetermined function adapted to the information recording medium to control access to the information recording medium, and wherein the default ACD includes common information set to permit writing/reading with respect to sub-areas defined on the information recording medium and predetermined specific information.

According to a further aspect of the present invention, there is provided a recording/reproducing method including changing data in an ACD block, regarding a function recognizable by a recording/reproducing apparatus, in an access control area when an information recording medium is reinitialized; and recording a value indicating "available" in an ACD block, regarding a function unrecognizable by the recording/reproducing apparatus, in the access control area, when the information recording medium is reinitialized, wherein the access control area is provided in the information recording medium to record ACD therein, the ACD having common information set to allow the recording/reproducing apparatus that cannot recognize a predetermined function adapted to the information recording medium to control access to the information recording medium.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and/or advantages of the present invention will become more apparent and more readily appreciated by describing in detail embodiments thereof with reference to the accompanying drawings in which:

FIG. 13 illustrates an example of ACD state information shown in FIG. 12;

FIGS. 14A and 14B illustrate examples of ACD blocks and ACD state information, respectively, before reinitialization of a disc to explain an update of the ACD state information when the disc is reinitialized according to an aspect of the present invention;

FIGS. 15A and 15B illustrate examples of the ACD blocks and the ACD state information, respectively, after the reinitialization of the disc to explain an update of the ACD state information when the disc is reinitialized according to an aspect of the present invention;

FIG. 16 is a flowchart of a reinitialization method according to another embodiment of the present invention;

DETAILED DESCRIPTION OF THE EMBODIMENTS

Figure 1:
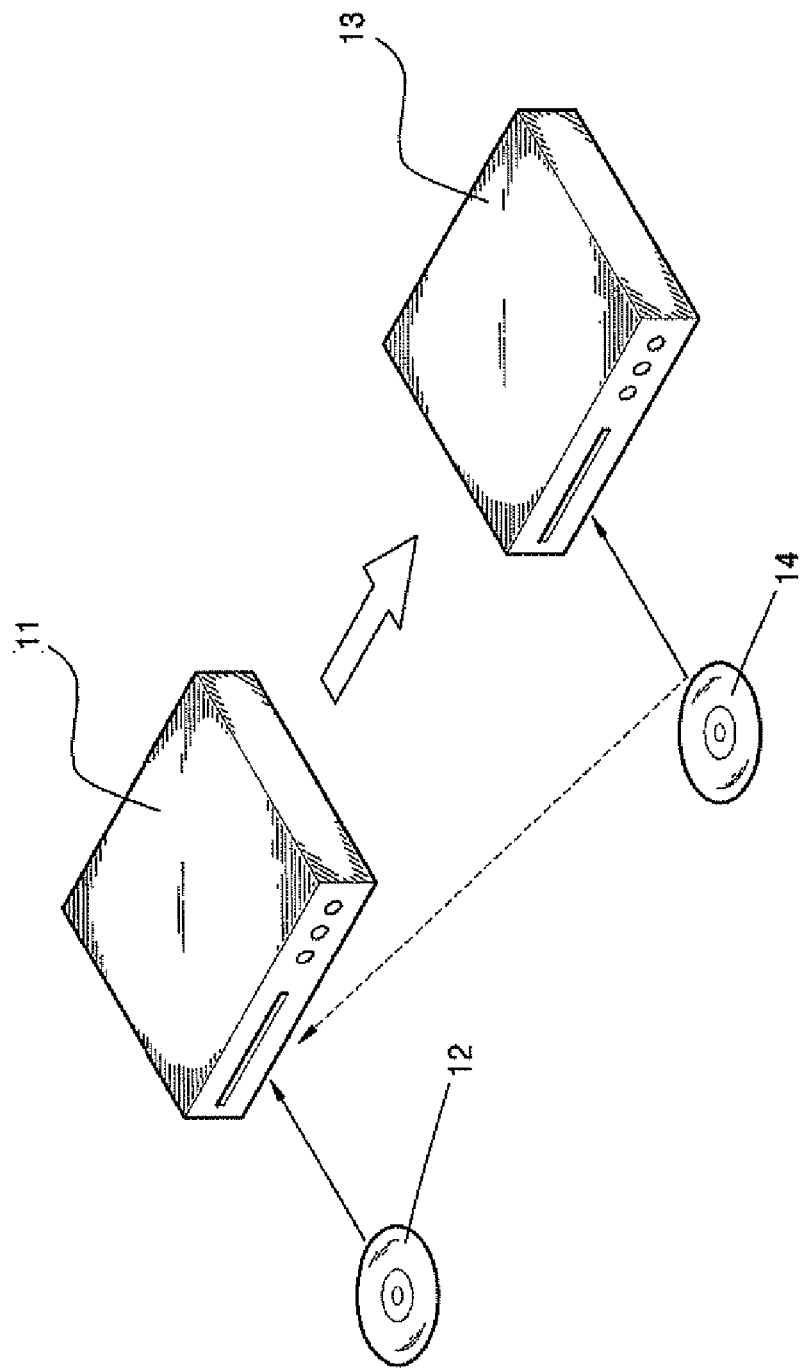
FIG. 1 is a diagram for explaining compatibility between discs and drive systems of different standards in the conventional technology.

Reference will now be made in detail to the embodiments of the present invention, examples of which are illustrated in the accompanying drawings, wherein like reference numerals refer to the like elements throughout. The embodiments are described below in order to explain aspects of the present invention by referring to the figures.

Figure 2:
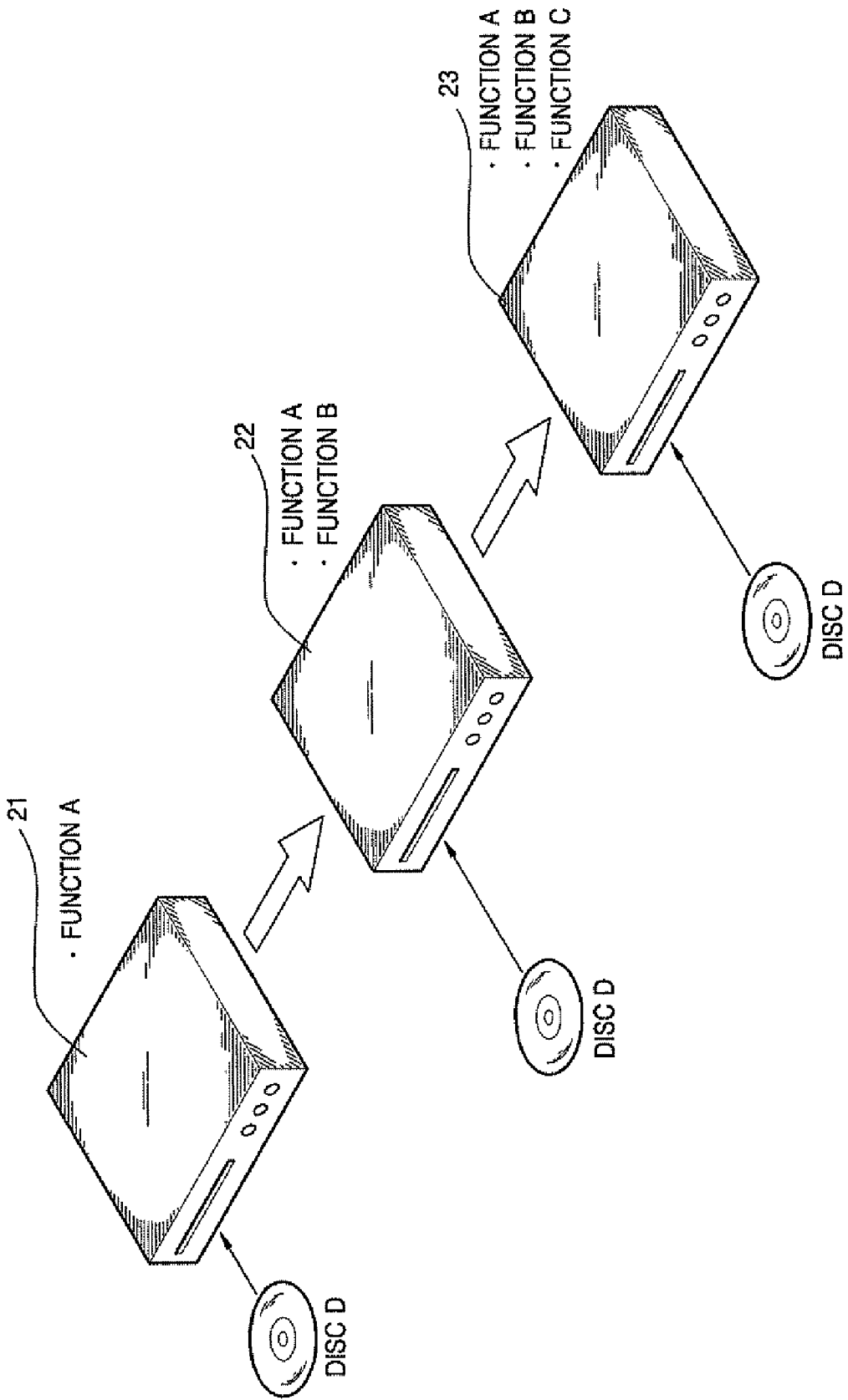
FIG. 2 is a diagram for explaining compatibility between a disc and drive systems of different standards in initialization or reinitialization according an aspect of to the present invention.

FIG. 2 is a diagram for explaining compatibility between a disc and drive systems of different standards in initialization or reinitialization according to an aspect of the present invention. Referring to FIG. 2, a standard defined for a rewritable recording medium adapted to a function A is referred to as a version 1.0, and a recording/reproducing apparatus implementing the version 1.0 is referred to as a version 1.0 drive system 21. An update standard obtained by adding a new function B to the version 1.0 is referred to as a version 1.1, and a recording/reproducing apparatus implementing the version 1.1 is referred to as a version 1.1 drive system 22. A further update standard obtained by adding a new function C to the version 1.1 is referred to as a version 1.2, and a recording/reproducing apparatus implementing the version 1.2 is referred to as a version 1.2 drive system 23. A disc D is a rewritable recording medium for the versions 1.0, 1.1, and 1.2.

The version 1.0 drive system 21 cannot recognize the functions B and C. The version 1.1 drive system 22 cannot recognize the function C. However, the version 1.2 drive system 23 can recognize both of the functions B and C. In this situation, when the disc D is empty and is initialized by the version 1.0 drive system 21, the version 1.0 drive system 21 needs to initialize the empty disc D such that the initialized disc D can be recognized by both of the version 1.1 drive system 22 and the version 1.2 drive system 23. When the disc D is empty and is initialized by the version 1.1 drive system 22, the version 1.1 drive system 22 needs to initialize the empty disc D such that the initialized disc D can be recognized by both of the version 1.0 drive system 21 and the version 1.2 drive system 23. Similarly, when the disc D is empty and is initialized by the version 1.2 drive system 23, the version 1.2 drive system 23 needs to initialize the empty disc D such that the initialized disc D can be recognized by both of the version 1.0 drive system 21 and the version 1.1 drive system 22.

In order to initialize an empty disc by a certain version of a drive system usable in the other versions of the drive system, information that can be recognized by all versions of the drive system must be used. In an aspect of the present invention, a disc is initialized using a defect management area (DMA) and an access control area (ACA), which are provided in a lead-in area of the disc, so that the initialized disc can be recognized by different versions of a drive system. In other words, initialization information is recorded in the DMA and the ACA during initialization of the disc so that the initialized disc can be appropriately used by the different versions of the drive system based on the initialization information.

Referring to FIG. 2, when the disc D is initialized by the version 1.0 drive system 21, since the function A can be recognized by all of the version 1.0 drive system 21, the version 1.1 drive system 22, and the version 1.2 drive system 23, information regarding the function A can be changed by the version 1.1 drive system 22 and the version 1.2 drive system 23 according to a user's or drive manufacture's intention.

When the disc D is initialized by the version 1.1 drive system 22, since the version 1.0 drive system 21 cannot recognize the function B, information prescribing operations that the version 1.0 drive system 21 needs to perform with respect to the function B is recorded in the ACA according to a rule or scheme that was made when the version 1.0 was made. As a result, when the disc D adapted to the function B is loaded into the version 1.0 drive system 21, the version 1.0 drive system 21 can appropriately operate, thereby providing convenience in using the disc D.

When the disc D is initialized by the version 1.2 drive system 23, since the version 1.0 drive system 21 and the version 1.1 drive system 22 cannot recognize the function C, information prescribing operations that the version 1.0 drive system 21 and the version 1.1 drive system 22 need to perform with respect to the function C is recorded in the access control area according to the rule or scheme that was made when the version 1.0 was made. As a result, when the disc D adapted to the function C is loaded into the version 1.0 drive system 21 or the version 1.1 drive system 22, the version 1.0 drive system 21 and the version 1.1 drive system 22 can appropriately operate, thereby providing convenience in using the disc D. In addition, the information prescribing operations that the version 1.0 drive system 21 needs to perform with respect to the function B is recorded in the ACA according to the rule or scheme that was made when the version 1.0 was made. As a result, when the disc D adapted to the function B is loaded into the version 1.0 drive system 21, the version 1.0 drive system 21 can appropriately operate, thereby providing convenience in using the disc D.

In the same manner, a used disc is reinitialized. To enable the used disc to be recognized by different versions of a drive system, the used disc is reinitialized using a DMA and an ACA provided in a lead-in area of the used disc. However, reinitialization is different from initialization in that whether information recorded in the used disc allows reinitialization of the used disc is determined first even if a reinitialization command is input by a user. Whether to reinitialize the used disc may be determined based on access control data (ACD) recorded in the ACA, which will be described in detail later.

Figure 3:
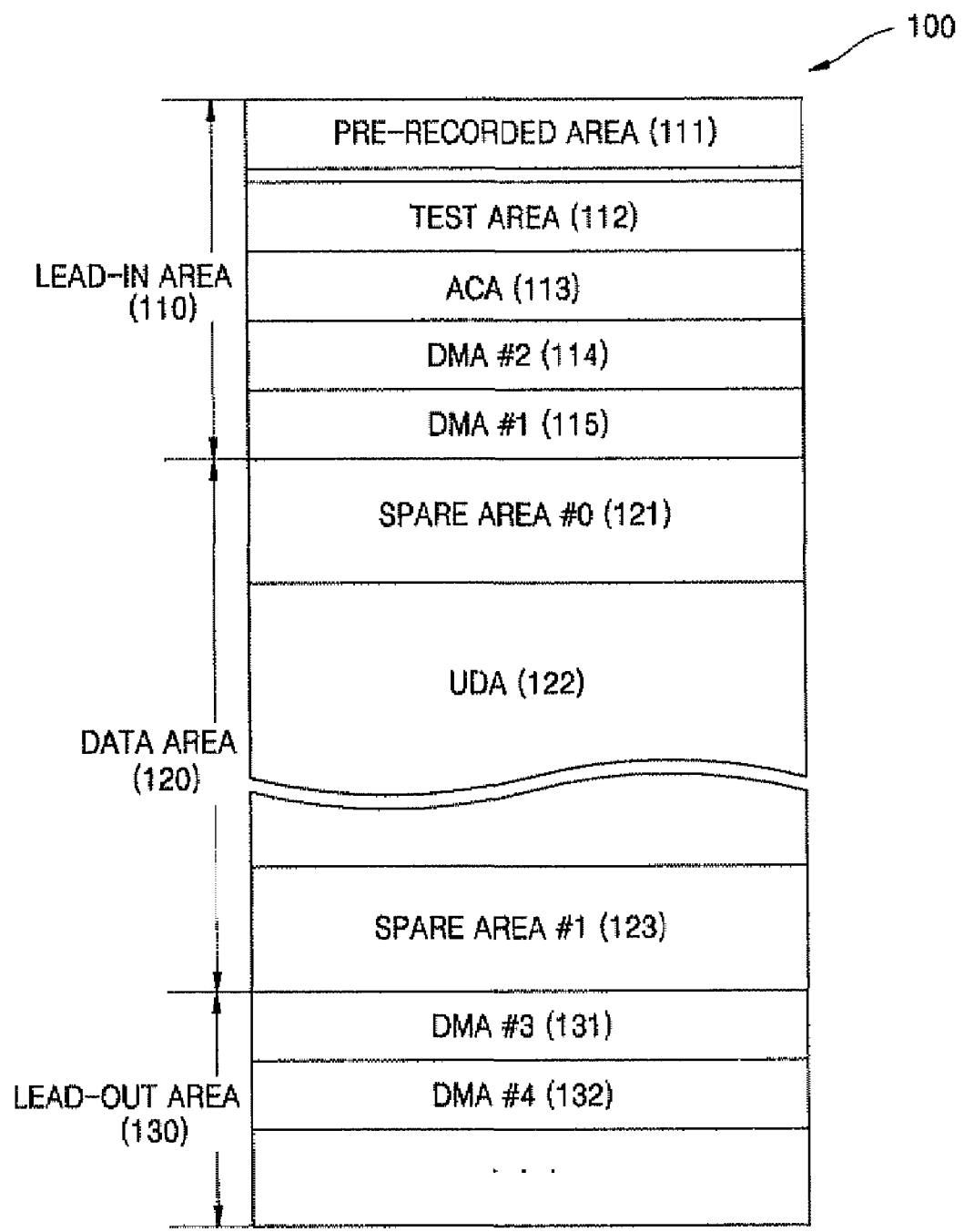
FIG. 3 illustrates a structure of an optical recording medium according to an aspect of the present invention.

FIG. 3 illustrates a structure of a disc 100 using an aspect of the present invention. Referring to FIG. 3, the disc 100 sequentially includes a lead-in area 110, a data area 120, and a lead-out area 130. The lead-in area 110 includes a pre-recorded area 111 in which predetermined data is recorded when the disc 100 is manufactured, a test area 112, an ACA 113, a DMA #2 114, and a DMA #1 115. The pre-recorded area 11 can be used only for reading. The test area 112, the ACA 113, the DMA #2 114, and the DMA #1 115 are areas to which data can be written and rewritten.

The pre-recorded area 111 stores information regarding the disc 100 that is recorded when the disc 100 is manufactured. For example, the pre-recorded area 111 stores a disc ID such as a disc manufacturing number that identifies the disc 100. However, it is understood that additional data can be included in the pre-recorded area 111.

The test area 112 is provided to test recording power or the like for optimal recording on the disc 100.

The ACA 113 is provided to record information prescribing operations of a drive system for a new function to be added afterwards. Common information enabling a drive system that cannot recognize a certain function to access the disc 100 is recorded in the ACA 113, which will be described in detail with reference to FIG. 5.

The DMA #1 115 and the DMA #2 114 are provided to record information regarding a defect occurring in a user data area (UDA) 122. The DMA #1 115 and the DMA #2 114 will be described in detail with reference to FIG. 3.

The data area 120 includes spare area #0 121, the UDA 122, and spare area #1 123. The UDA 122 is provided to record user data. The spare area #0 121 and the spare area #1 123 provide spare blocks replacing defective blocks occurring in the UDA 122. Such spare areas are allocated to the data area 122 during initialization or reinitialization of the disc 100. The lead-out area 130 includes DMA #3 131 and DMA #4 132.

Figure 4:
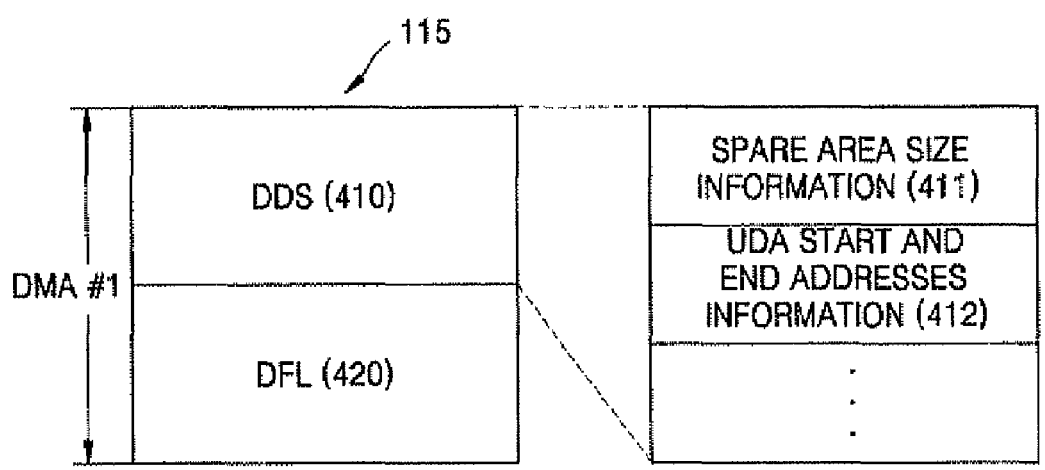
FIG. 4 illustrates an example of a detailed structure of defect management area (DMA) #1 shown in FIG. 3.

FIG. 4 illustrates a detailed structure of the DMA #1 115 shown in FIG. 3. Referring to FIG. 4, the DMA #1 115 includes a disc definition structure (DDS) 410 and a defect list (DFL) 420. The DDS 410 includes disc management information. In detail, the DDS 410 includes spare area size information 411 and UDA start and end addresses information 412 as information recorded on a disc during initialization or reinitialization. When initializing or reinitializing a disc, a drive system allocates a spare area to a data area, determines the UDA 122 in which user data is recorded in the data area, and records information regarding the spare area and the UDA 122 in the DDS 410. The DFL 420 contains information regarding a defect occurring in the UDA 122. For example, the DFL 420 includes an address of a defective block occurring in the UDA 122, an address of a spare block replacing the defective block, and state information regarding the defect.

Figure 5:
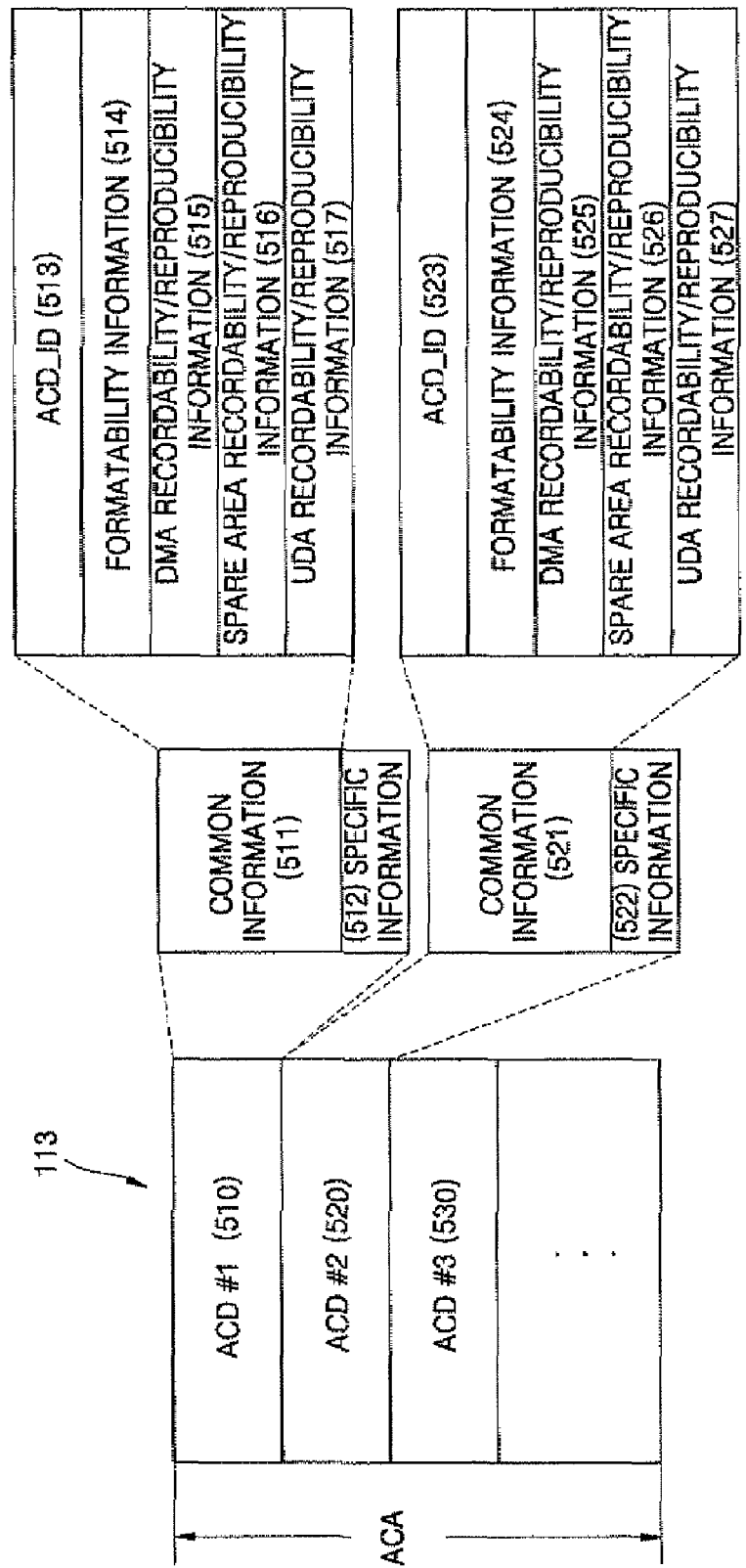
FIG. 5 illustrates a detailed structure of an access control area (ACA) shown in FIG. 3.

FIG. 5 illustrates a detailed structure of the ACA 113 shown in FIG. 3. Referring to FIG. 5, the ACA 113 includes ACD #1 510, ACD #2 520, and ACD #3 530. The ACA 113 is an area in which common information used to access a disc regardless of existing or new standards is recorded. In other words, the ACA 113 stores a common information table applied in common to all functions used in existing standards and new standards. While not required in all aspects, the ACD constitutes a common information table regarding each function. For example, the ACD #1 510 constitutes a common information table regarding "function1", the ACD #2 520 constitutes a common information table regarding "function2", and the ACD #3 530 constitutes a common information table regarding "function3". The function1 may be recognized by a drive system, and the function2 and the function3 may not be recognized by the drive system. ACD may also include specific information that only a drive system recognizing a function corresponding to the ACD can recognize.

The ACD #1 510 includes common information 511 and specific information 512. The common information 511 includes an ACD_ID 513 (i.e., an ID identifying ACD) formatability information 514 indicating whether the disc can be formatted, DMA recordability/reproducibility information 515 indicating whether a DMA is recordable or is only reproducible, spare area recordability/reproducibility information 516 indicating whether a spare area is recordable or is only reproducible, and UDA recordability/reproducibility information 517 indicating whether a UDA is recordable or is only reproducible. The formatability information 514, the DMA recordability/reproducibility information 515, the spare area recordability/reproducibility information 516, and the UDA recordability/reproducibility information 517 constitute the common information table.

A drive system can determine based on the ACD_ID 513 whether the ACD #1 510 is about a recognizable function. In other words, if the drive system knows the ACD_ID 513, the ACD #1 510 is determined as being about a recognizable function. Otherwise, the ACD #1 510 is determined as being about an unrecognizable function. In addition, even though the drive system does not know the ACD_ID 513, the drive system can perform at least minimum proper operations with respect to an unrecognizable function based on fields included in the common information table.

The ACD #2 520 also includes common information 521 and specific information 522. The common information 512 includes an ACD_ID 523 and a common information table containing formatability information 524, DMA recordability/reproducibility information 525, spare area recordability/reproducibility information 526, and UDA recordability/reproducibility information 527.

ACD recorded in the ACA 113 when a disc is initialized or reinitialized by an each of the drive systems 21 through 23 under the conditions illustrated in FIG. 2 will be described with reference to FIGS. 6 and 7 below.

Figure 6:
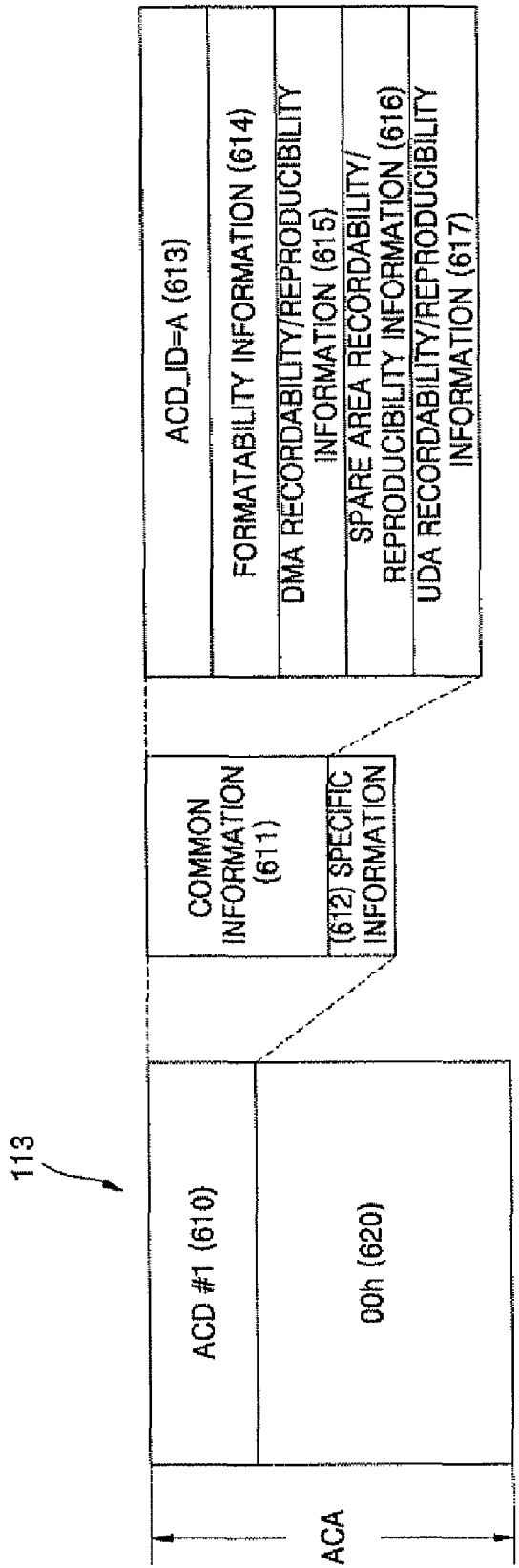
FIG. 6 illustrates an example of access control data (ACD) recorded in the ACA by a version 1.0 drive system shown in FIG. 2 during initialization or reinitialization.

FIG. 6 illustrates an example of the ACD recorded in the ACA 113 by the version 1.0 drive system 21 shown in FIG. 2 during initialization or reinitialization. Referring to FIG. 6, the version 1.0 drive system 21 knows only the function A and thus records only ACD #1 610 regarding the function A in the ACA 113. After finishing recording the ACD #1 610 in the ACA 113, the version 1.0 drive system 21 fills a remaining unrecorded area 620 with 00h. The unrecorded area 620 may also be filled with FFh according to an aspect of the invention. The unrecorded area 620 is filled with 00h or FFh to indicate that there is no more ACD in the ACA 113 and to enable the unrecorded area 620 to be used afterwards.

The ACD #1 610 includes common information 611 and specific information 612. The common information 611 includes an ACD_ID 613 as an ID of the ACD #1 610, in which "A" indicating the function A known to the version 1.0 drive system 21 is recorded, and also includes a common information table containing formatability information 614, DMA recordability/reproducibility information 615, spare area recordability/reproducibility information 616, and UDA recordability/reproducibility information 617, which are set to zero (0) indicating "recordable". Since the initialization or reinitialization is performed to enable a disc to be used, all of the formatability and recordability information are set to "recordable".

Since the function A, the content of which is contained in the ACD #1 610 recorded in the ACA 113 of the initialized disc D, can be recognized by all of the drive systems 21 through 23, the ACD #1 610 can be changed by a user or a drive manufacturer when the initialized disc D is loaded into and used in any of the drive systems 21 through 23.

Figure 7:
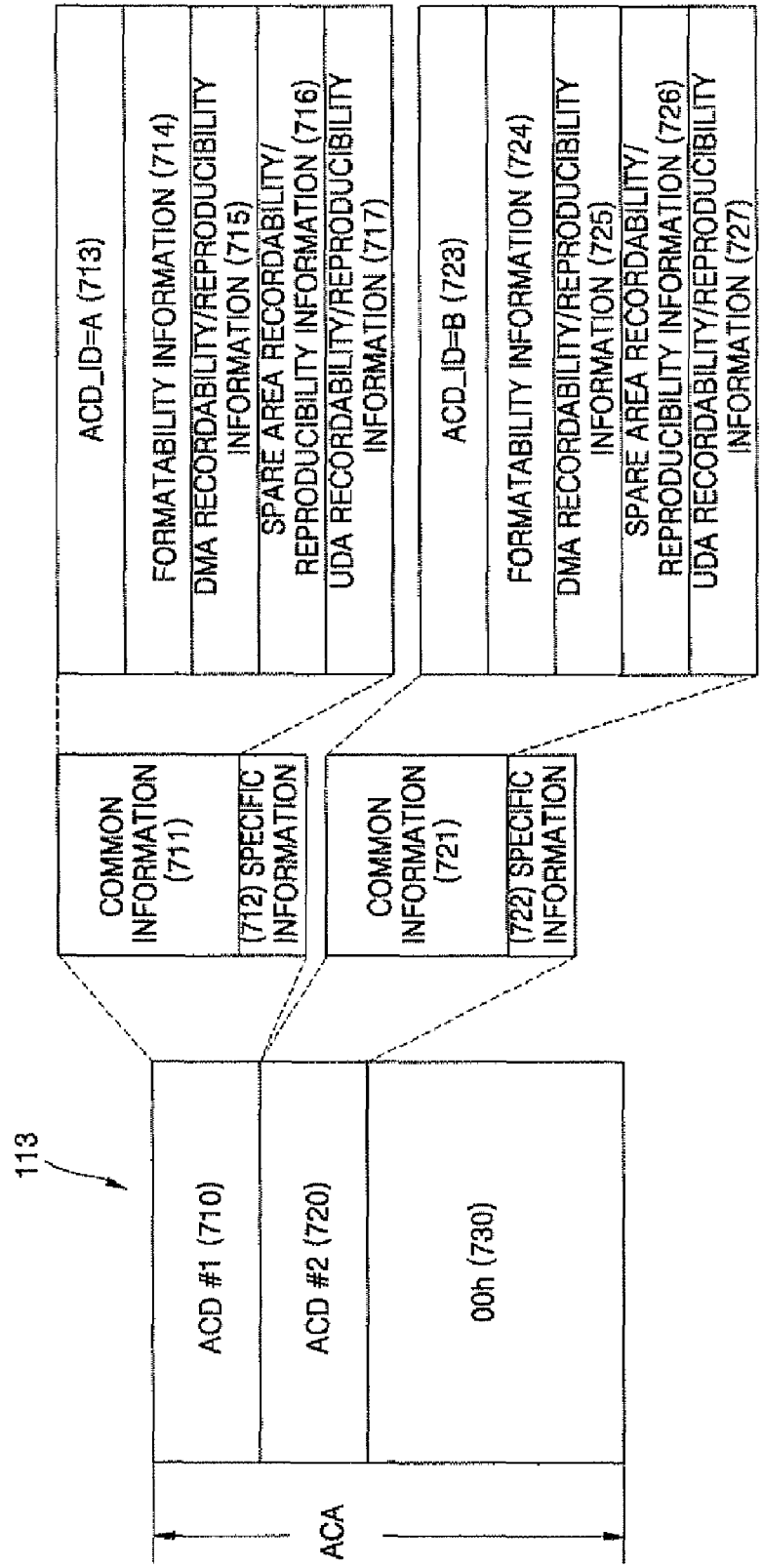
FIG. 7 illustrates an example of ACD recorded in the ACA by a version 1.1 drive system shown in FIG. 2 during initialization or reinitialization.

FIG. 7 illustrates an example of the ACD recorded in the ACA 113 by the version 1.1 drive system shown in FIG. 2 during initialization or reinitialization. Referring to FIG. 7, the version 1.1 drive system 22 knows the function A and the function B and thus records ACD #1 710 regarding the function A and ACD #2 720 regarding the function B in the ACA 113. After finishing recording the ACD #1 710 and the ACD #1 720 in the ACA 113, the version 1.1 drive system 22 fills a remaining unrecorded area 730 with 00h or FFh.

The ACD #1 710 includes common information 711 and specific information 712. The common information 711 includes an ACD_ID 713 as an ID of the ACD #1 710, in which "A" indicating the function A known to the version 1.1 drive system 22 is recorded, and also includes a common information table containing formatability information 714, DMA recordability/reproducibility information 715, spare area recordability/reproducibility information 716, and UDA recordability/reproducibility information 717, which are set to zero (0) indicating "recordable". Since the initialization or reinitialization is performed to enable a disc to be used, all of the formatability and recordability information are set to "recordable".

The ACD #2 720 includes common information 721 and specific information 722. The common information 721 includes an ACD_ID 723 as an ID of the ACD #1 720, in which "B" indicating the function B known to the version 1.1 drive system 22 is recorded, and also includes a common information table containing formatability information 724, DMA recordability/reproducibility information 725, spare area recordability/reproducibility information 726, and UDA recordability/reproducibility information 727, which are set to zero (0) indicating "recordable".

Since the function A, the content of which is contained in the ACD #1 710 recorded in the ACA 113 of the initialized disc D, can be recognized by all of the drive systems 21 through 23, the ACD #1 710 can be changed by a user or a drive manufacturer when the initialized disc D is loaded into and used in any of the drive systems 21 through 23. The function B regarding which the ACD #2 720 has been recorded in the ACA 113 cannot be recognized by the version 1.0 drive system 21, but the version 1.0 drive system 21 can operate to access the initialized disc D using the common information 721 included in the ACD #2 720.

Figure 8:
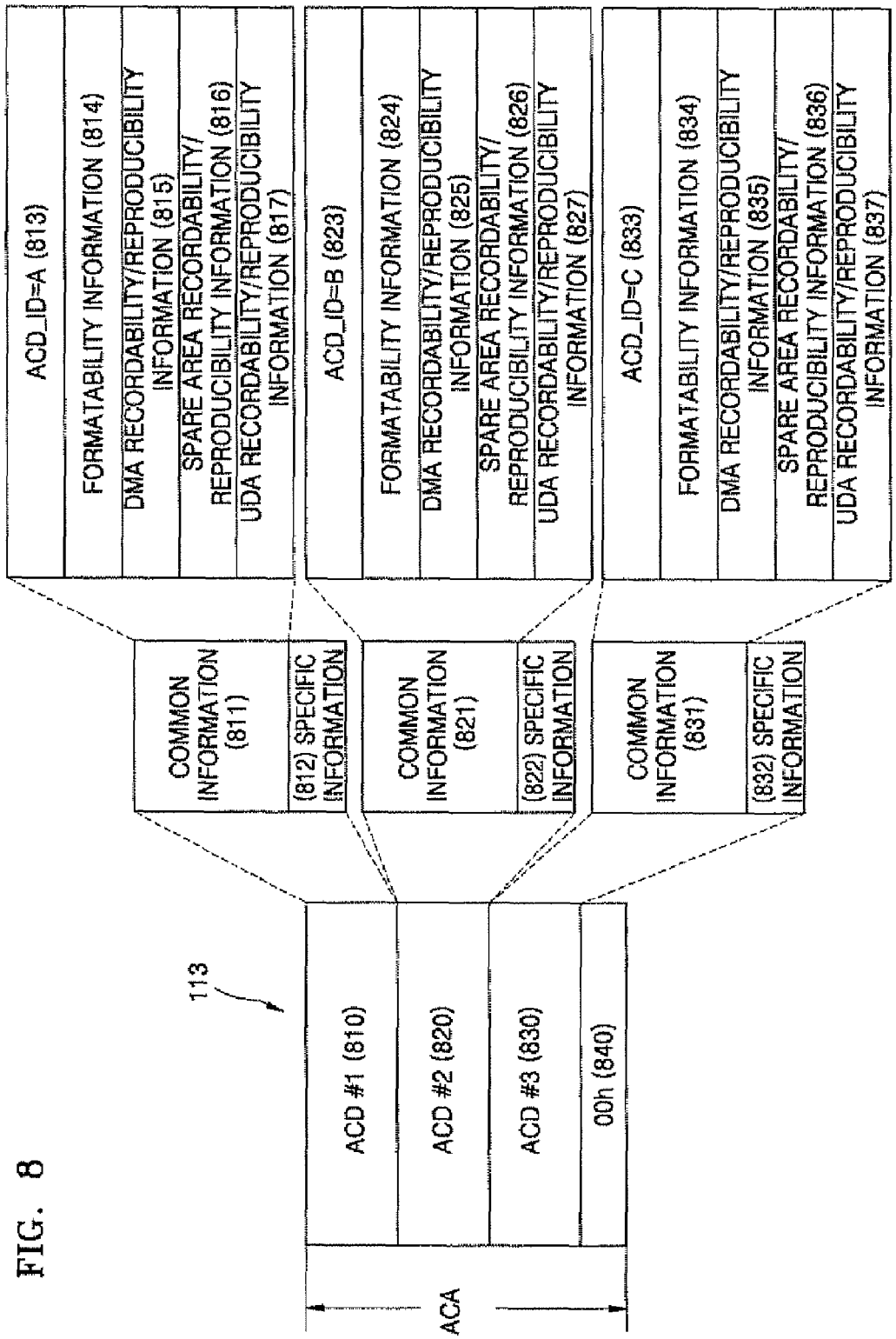
FIG. 8 illustrates an example of ACD recorded in the ACA by a version 1.2 drive system shown in FIG. 2 during initialization or reinitialization.

FIG. 8 illustrates an example of the ACD recorded in the ACA 133 by the version 1.2 drive system shown in FIG. 2 during initialization or reinitialization. Referring to FIG. 8, the version 1.2 drive system 22 knows the function A, the function B, and the function C and thus records ACD #1 810 regarding the function A, ACD #2 820 regarding the function B, and ACD #3 830 regarding the function C in the ACA 113. Thereafter, the version 1.2 drive system 23 fills a remaining unrecorded area 840 with 00h or FFh.

The ACD #1 810 includes common information 811 and specific information 812. The common information 811 includes an ACD_ID 813 as an ID of the ACD #1 810, in which "A" indicating the function A known to the version 1.2 drive system 23 is recorded, and also includes a common information table containing formatability information 814, DMA recordability/reproducibility information 815, spare area recordability/reproducibility information 816, and UDA recordability/reproducibility information 817, which are set to zero (0) indicating "recordable". Since the initialization or reinitialization is performed to enable a disc to be used, all of the formatability and recordability information are set to "recordable".

The ACD #2 820 includes common information 821 and specific information 822. The common information 821 includes an ACD_ID 823 as an ID of the ACD #2 820, in which "B" indicating the function B known to the version 1.2 drive system 23 is recorded, and also includes a common information table containing formatability information 824, DMA recordability/reproducibility information 825, spare area recordability/reproducibility information 826, and UDA recordability/reproducibility information 827, which are set to zero (0) indicating "recordable".

The ACD #3 830 includes common information 831 and specific information 832. The common information 831 includes an ACD_ID 833 as an ID of the ACD #3 830, in which "C" indicating the function C known to the version 1.2 drive system 23 is recorded, and also includes a common information table containing formatability information 834, DMA recordability/reproducibility information 835, spare area recordability/reproducibility information 836, and UDA recordability/reproducibility information 837, which are set to zero (0) indicating "recordable".

Since the function A, the content of which is contained in the ACD #1 810 recorded in the ACA 113 of the initialized disc D, can be recognized by all of the drive systems 21 through 23, the ACD #1 810 can be changed by a user or a drive manufacturer when the initialized disc D is loaded into and used in any of the drive systems 21 through 23. The function B regarding which the ACD #2 820 has been recorded in the ACA 113 cannot be recognized by the version 1.0 drive system 21, but the version 1.0 drive system 21 can operate to access the initialized disc D using the common information 821 included in the ACD #2 820. The function C regarding which the ACD #3 830 has been recorded in the ACA 113 cannot be recognized by the version 1.0 drive system 21 and the version 1.1 drive system 22, but the version 1.0 drive system 21 and the version 1.1 drive system 22 can operate to access the initialized disc D using the common information 831 included in the ACD #3 830.

Figure 9:
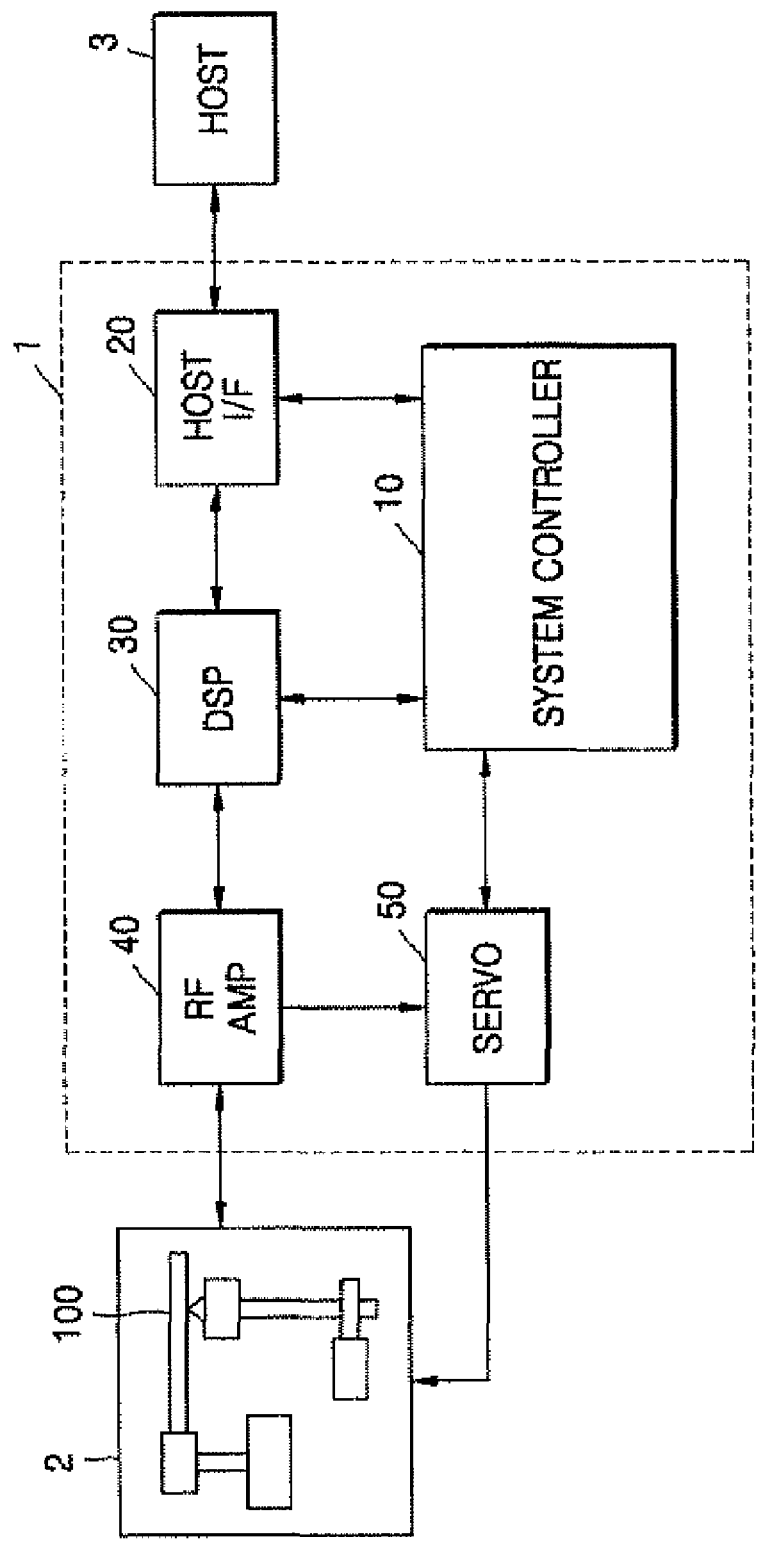
FIG. 9 is a schematic block diagram of a recording/reproducing apparatus performing initialization and reinitialization according to an embodiment of the present invention.

FIG. 9 is a schematic block diagram of a recording/reproducing apparatus according to an embodiment of the present invention. Referring to FIG. 9, the recording/reproducing apparatus includes a writing/reading unit 2 and a control unit 1. The writing/reading unit 2 includes a pickup and writes data to and reads data from the disc 100 that is an optical recording medium of the present invention. The control unit 1 controls the writing/reading unit 2 to write data to and read data from the disc 100 according to a predetermined file system. More particularly, the control unit 1 performs control to initialize an empty disc and to reinitialize a used disc. The control unit 1 includes a system controller 10, a host interface (I/F) 20, a digital signal processor (DSP) 30, a radio frequency (RF) amplifier (AMP) 40, and a servo 50.

During recording, the host I/F 20 receives a predetermined write command from a host 3 and transmits the received command to the system controller 10. The system controller 10 controls the DSP 30 and the servo 50 to execute the write command received from the host I/F 20. The DSP 30 adds additional data, such as a parity, to data received from the host I/F 20 to be written, performs error correction coding (ECC) to generate an ECC block for error correction, and modulates the ECC block in a predetermined mode. The RF AMP 40 converts data output from the DSP 30 into an RF signal. The writing/reading unit 2 including the pickup writes the RF signal received from the RF AMP 40 to the disc 100. The servo 50 receives a servo control command from the system controller 10 and servo controls the pickup included in the writing/reading unit 2.

During reproduction, the host I/F 20 receives a read command from the host 3. The system controller 10 performs initialization needed for reproduction. The writing/reading unit 2 radiates a laser beam on the disc 100 and outputs an optical signal obtained from the laser beam reflected from the disc 100. The RF AMP 40 converts the optical signal received from the writing/reading unit 2 into an RF signal, provides modulated data obtained from the RF signal to the DSP 30, and provides a servo signal obtained from the RF signal to the servo 50. The DSP 30 demodulates the modulated data and outputs data obtained by performing ECC on the demodulated data. Meanwhile, the servo 50 receives the servo signal from the RF AMP 40 and the servo control command from the system controller 10 and servo controls the pickup. The host I/F 20 transmits the data from the DSP 30 to the host 3. The system controller 10 reads disc management information or defect information from the disc 100 and controls the servo 50 to read data from a position where data has been recorded with no defects on the disc 100.

According to aspects of the invention, the recording/reproducing apparatus illustrated in FIG. 9 may be implemented as an individual recording apparatus, an individual reproducing apparatus, as a single recording and reproducing apparatus, as a stand alone apparatus, and/or as part of a computer system.

An exemplary initialization method and an exemplary reinitialization method which are performed by a recording/reproducing apparatus according to an embodiment of the present invention will be described with reference to FIGS. 10 and 11 below.

Figure 10:
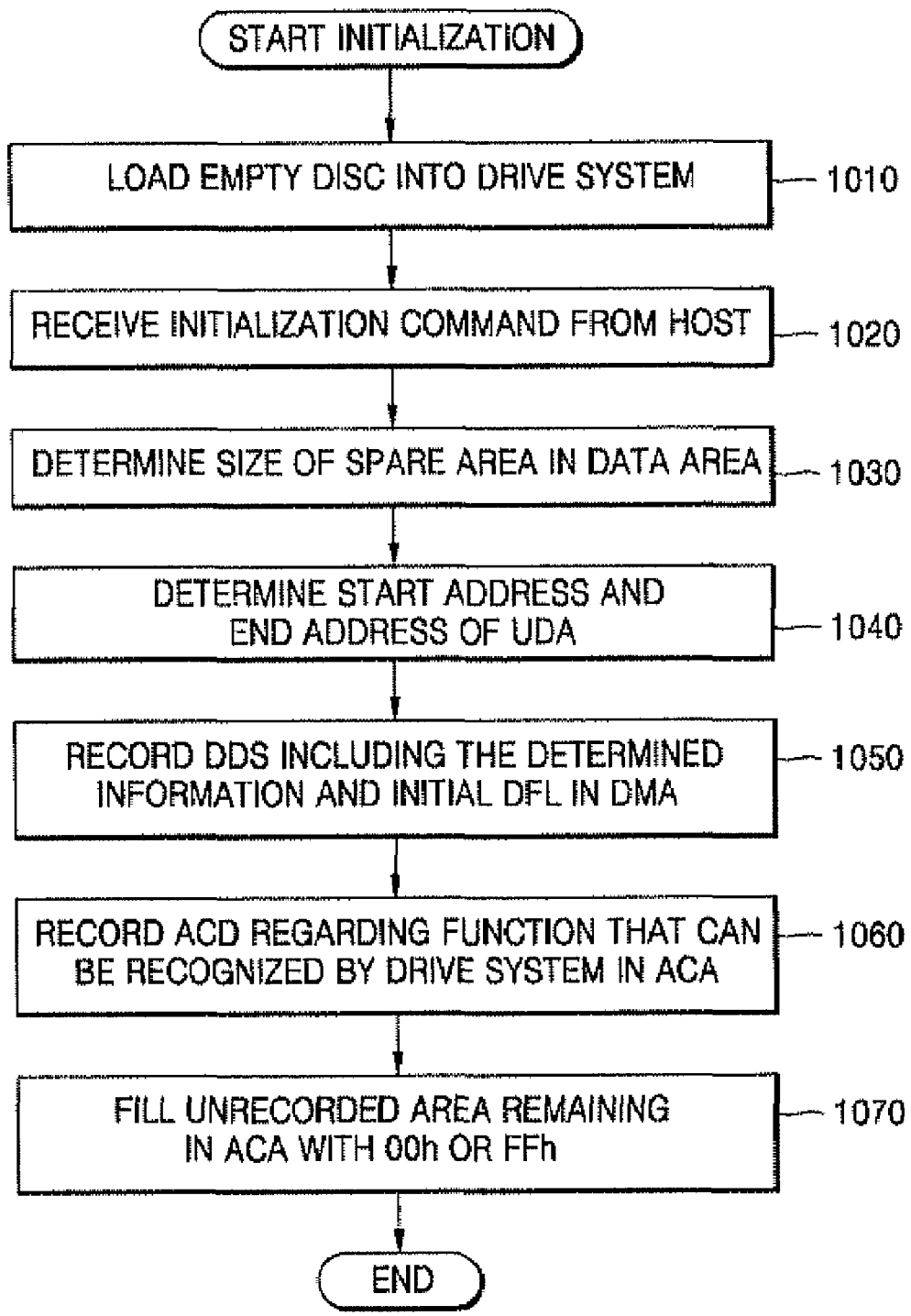
FIG. 10 is a flowchart of an initialization method according to an embodiment of the present invention.

FIG. 10 is a flowchart of an initialization method according to an embodiment of the present invention. Referring to FIG. 10, in operation 1010, the disc 100 that is empty is loaded into a drive system. In operation 1020, the system controller 10 included in the drive system receives an initialization command from the host 3 through the host I/F 20. The system controller 10 assigns a spare area in a data area of the disc 100 to determine a size of the spare area in operation 1030 and assigns a UDA for recording user data in the data area to determine a start address and an end address of the UDA in operation 1040. The spare area may be assigned by the host 3 or may be assigned with a predetermined size by a drive manufacturer.

In operation 1050, the system controller 10 controls the writing/reading unit 2 and the servo 50 to record a DDS, which includes information regarding the assignment of the spare area and information regarding the assignment of the UDA, and an initial DFL in a DMA included in a lead-in area of the disc 100. Initialization information recorded in the DMA has been described in detail with reference to FIG. 4.

In operation 1060, the system controller 10 controls the writing/reading unit 2 and the servo 50 to record ACD regarding a function that can be recognized by the drive system in an ACA included in the lead-in area of the disc 100. Access control information recorded in the ACA has been described in detail with reference to FIG. 5.

In operation 1070, the system controller 10 controls the writing/reading unit 2 and the servo 50 to fill an unrecorded area remaining in the ACA of the disc 100 with a predetermined value such as 00h or FFh.

Figure 11:
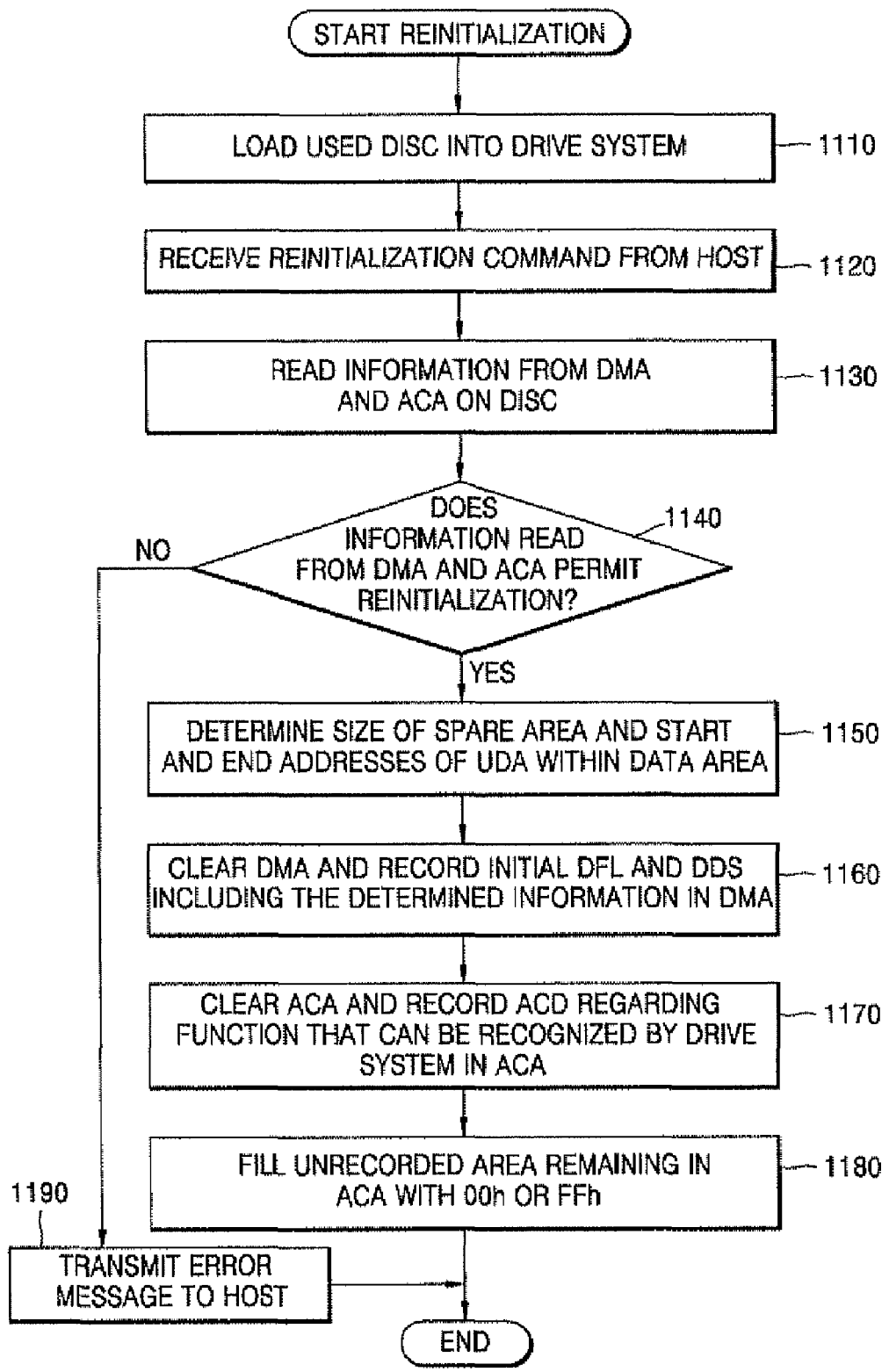
FIG. 11 is a flowchart of a reinitialization method according to an embodiment of the present invention.

FIG. 11 is a flowchart of a reinitialization method according to an embodiment of the present invention. Referring to FIG. 11, in operation 1110, the disc 100 that has been used is loaded into a drive system. Then, the system controller 10 included in the drive system recognizes DMA information and information prescribing operations that the drive system has to perform with respect to a function that the system controller 10 knows and a function that the system controller 10 does not know (i.e., ACD) recorded on the disc 100. Next, in operation 1120, the system controller 10 receives a reinitialization command from the host 3 through the host I/F 20.

In operation 1130, the system controller 10 controls the writing/reading unit 2 to read information recorded in a DMA and an ACA which are included in a lead-in area of the disc 100 and brings the information. The information recorded in the DMA may be a write protection flag, and the information recorded in the ACA may be information regarding recordability or formatability, which is included in common information of ACD.

In operation 1140, the system controller 10 determines whether the information read from the DMA and the ACA permits reinitialization. For example, if the write protection flag read from the DMA is "1", writing to the disc 100 is prohibited, and thus reinitialization cannot be performed such that an error message is transmitted in operation 1190. The common information of the ACD recorded in the ACA includes formatability information and recordability/reproducibility information regarding sub-areas of the disc 100. If the formatability information and the recordability/reproducibility information do not permit formatting of the disc 100 or writing to any of the sub-areas of the disc 100, reinitialization cannot be performed such that an error message is transmitted in operation 1190. Accordingly, the system controller 10 determines whether the disc 100 is recordable based on the information read from the DMA and the ACA.

If the write protection flag is set to "1" or if the common information of the ACD does not permit formatting or writing, the system controller 10 determines that the disc 100 cannot be reinitialized and transmits an error message to the host 3 through the host I/F 20 in operation 1190. However, if the write protection flag is not set to "1" and the common information of the ACD permits formatting and writing, the system controller 10 determines to reinitialize the disc 100 and starts reinitializing the disc 100.

Meanwhile, when ACD regarding functions that can be recognized by the drive system has values that do not permit reinitialization and ACD regarding functions that cannot be recognized by the drive system has values permitting reinitialization, the values of the ACD regarding the recognizable functions may be changed into values permitting reinitialization in response to the user's request for reinitialization since the values of the ACD regarding the recognizable functions can be updated, and then it may be determined to start reinitialization of the disc 100.

If reinitialization is permitted, the system controller 10 assigns a spare area in a data area of the disc 100 to determine a size of the spare area in operation and assigns a UDA for recording user data in the data area to determine a start address and an end address of the UDA in operation 1150.

In operation 1160, the system controller 10 controls the writing/reading unit 2 to clear the DMA included in the lead-in area on the disc 100 and controls the writing/reading unit 2 and the servo 50 to record an initial DFL and a DDS including the determined information, i.e., spare area assignment information and UDA assignment information, in the DMA. Although it has been described that initialization information is recorded in the DMA after being cleared, actually, the initialization information recorded in the DMA is updated the since the disc 100 is a rewritable type. Although not shown in FIG. 11, file system information recorded in a predetermined portion of the UDA to manage data recorded in the UDA should be cleared.

In operation 1170, the system controller 10 controls the writing/reading unit 2 to clear the ACA in the lead-in area on the disc 100 and controls the writing/reading unit 2 and the servo 50 to record the ACD regarding a function that the drive system can recognize in the ACA in the lead-in area on the disc 100.

In operation 1180, the system controller 10 controls the writing/reading unit 2 and the servo 50 to fill an unrecorded area remaining in the ACA in the lead-in area on the disc 100 with a predetermined value such as 00h or FFh. Operation 1180 is performed to indicate that there is no more ACD in the ACA and to enable the unrecorded area to be used afterwards.

The following description relates to a method of updating ACD block state information during reinitialization of a disc when state information regarding recordability or defectiveness of an ACD block in the ACA is managed. When state information of each of ACD blocks included in the ACA for recording ACD is recorded in a DDS and is managed, the ACD blocks can be efficiently managed. State information may indicate that ACD can be recorded in an ACD block, that an ACD block is defective or stores invalid ACD, that an ACD block stores valid ACD, and that an ACD block stores valid ACD but has a defect occurred during reproduction. An ACD block physically recorded in the ACA has an ACD_ID, from which a drive system can recognize what function the ACD block is about. When a disc is loaded in to a drive system, the drive system detects a position of a valid ACD block based on ACD block state information included in a DDS recorded in a DMA on the disc and reproduces the valid ACD block.

If the ACD block state information indicating that an ACD block has valid ACD is included in the DDS before reinitialization, the ACD block is fine. After the reinitialization, since ACD recorded in the ACD block is not necessary, the ACD block state information needs to be changed to indicate that the ACD block has no valid ACD and can be used for recording ACD. If the ACD block state information included in the DDS to indicate that the ACD block has valid ACD is not changed during the reinitialization, a drive system will reproduce the ACD block based on the ACD block state information. Accordingly, it is necessary to update such ACD block state information when a disc is reinitialized. In addition, since information included in the ACD block is not valid any more after the reinitialization, if the ACD block state information is not changed, a drive system may have trouble due to incorrect information obtained from the ACD block. Accordingly, in addition to changing the ACD block state information included in the DDS, the whole ACD block in the ACA or only an ACD_ID of the ACD block needs to be overwritten with a value, e.g., "00h" or "FFh" to physically erase. When the ACD_ID has a value of "00" or "FF", current ACD of the ACD block is not valid and the ACD block can be used for recording other ACD. Since "00h" or "FFh" is recorded in the ACD block when the ACD block is cleared, the ACD_ID of the ACD block becomes the value "00" or "FF".

Briefly, during reinitialization, a valid ACD block in the ACA on the disc is overwritten with a value such as "00h" or "FFh", and corresponding ACD block state information included in a DDS on the disc is changed to indicate that the ACD block does not have valid ACD and can be used for recording other ACD.

Figure 12:
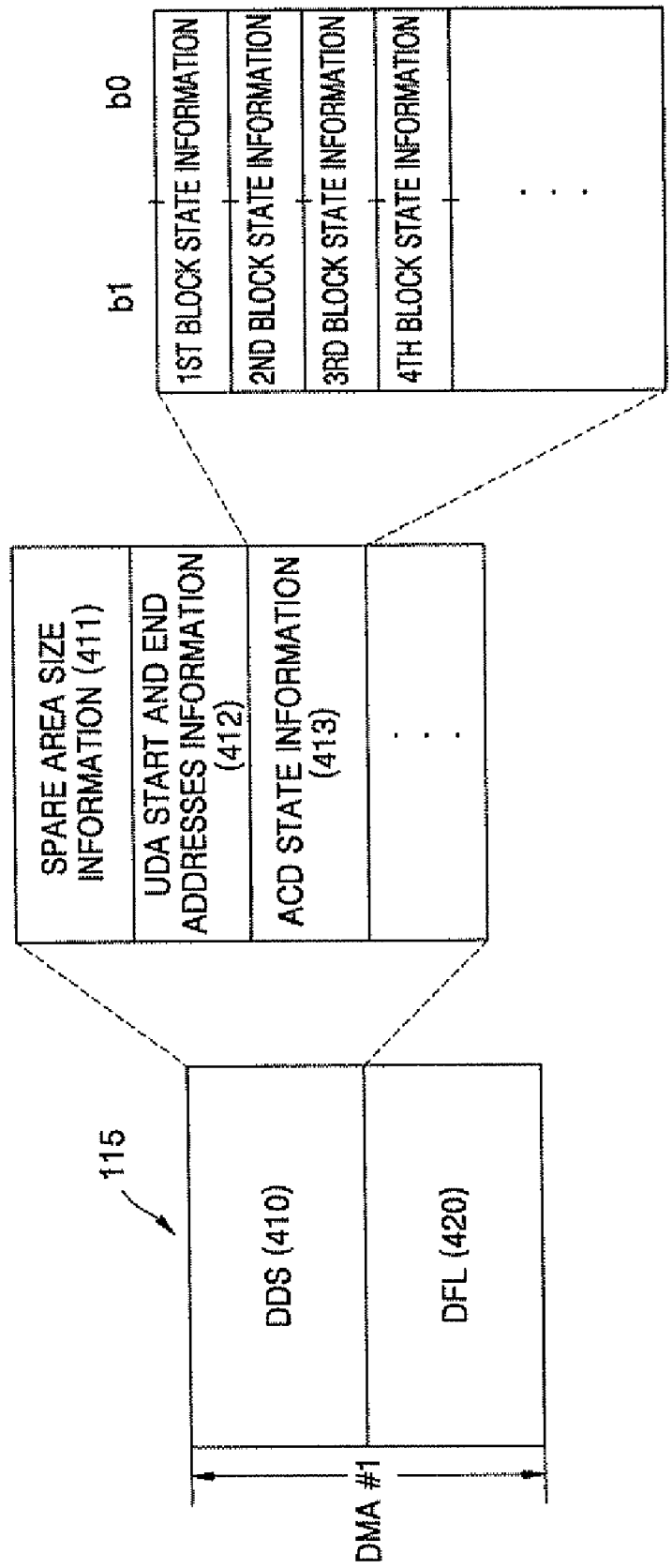
FIG. 12 illustrates another example of a detailed structure of the DMA #1 shown in FIG. 3.

FIG. 12 illustrates another example of a detailed structure of the DMA #1 115 shown in FIG. 3. Referring to FIG. 12, a DDS 410 is an area in which disc management information is recorded. Spare area size information 411, UDA start and end addresses information 412, and ACD state information 413 are recorded in the DDS 410. The ACD state information 413 includes state information regarding recordability or defectiveness of each of ACD blocks in which ACD is recorded in an ACA. Referring to FIG. 12, ACD block state information is two bits in length.

FIG. 13 illustrates examples of ACD block state information included in an ACD state information, such as the block state information shown in FIG. 12. Referring to FIG. 13, a state of each ACD block is expressed with 2 bits, i.e., "00", "01", "10", or "11" indicating one among four states. Bits "00" indicates that an ACD block is available for recording ACD. Bits "01" indicates that the ACD block is defective. More specifically, bits "01" indicate that the ACD block is detected as defective while ACD is recorded in an ACA or that the ACD block has invalid ACD. Bits "10" indicates that the ACD block has valid ACD but is detected as defective while ACD is reproduced from the ACA. Bits "11" indicate that the ACD block has valid ACD.

Figure 14B:
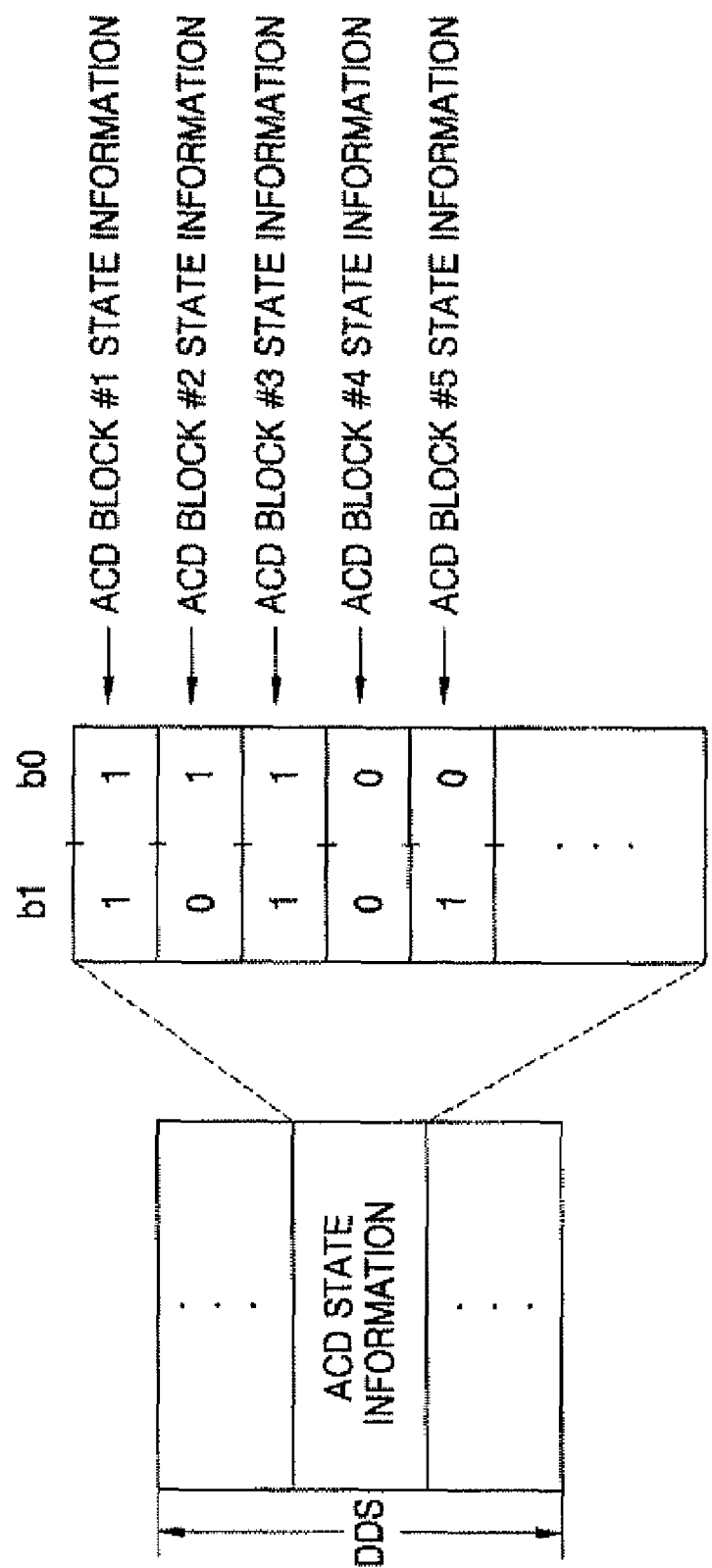
Figure 15B:
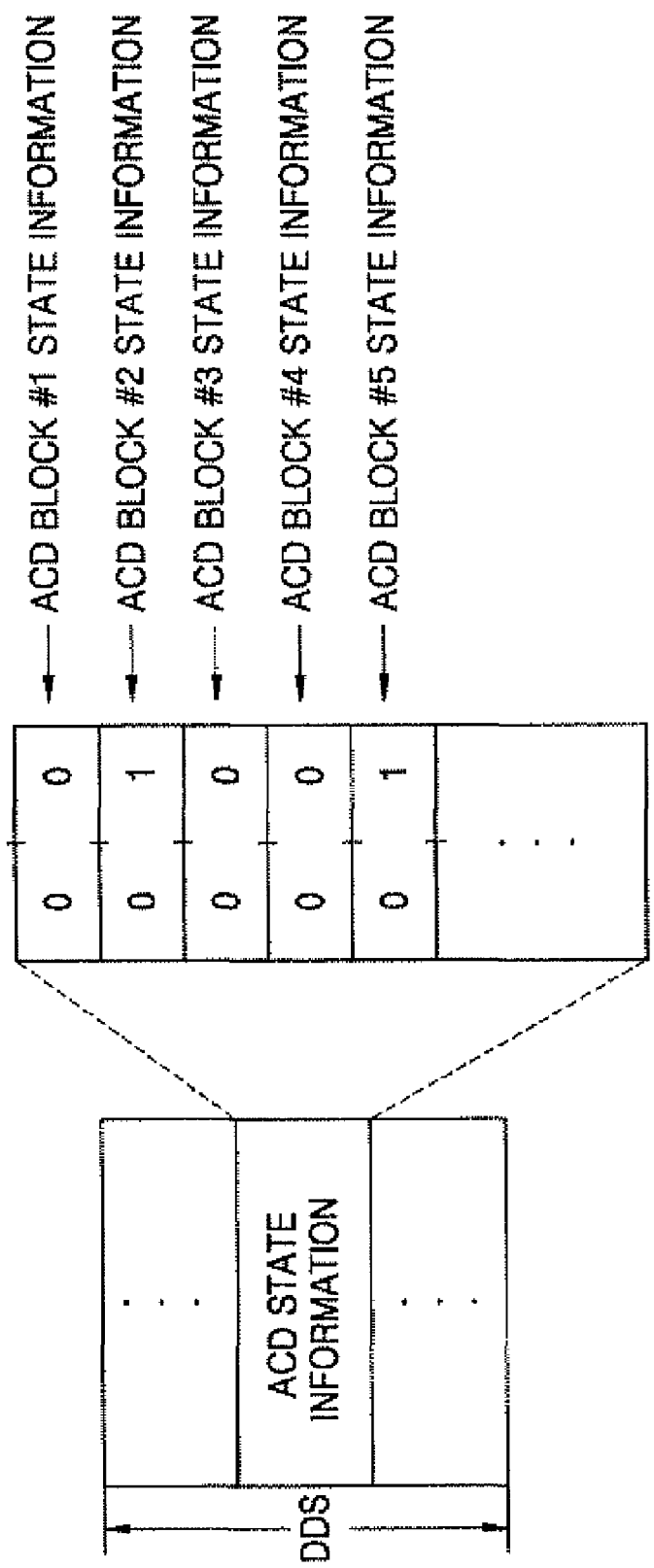

FIGS. 14A through 15B are diagrams for explaining an update of ACD state information when a disc is reinitialized according to the present invention. FIGS. 14A and 14B illustrate examples of ACD blocks and ACD state information, respectively, before the reinitialization. FIGS. 15A and 15B illustrate examples of the ACD blocks and the ACD state information, respectively, after the reinitialization.

Referring to FIG. 14A, before the reinitialization, an ACA includes five ACD blocks: an ACD block #1 having valid ACD, an ACD block #2 having defective ACD; an ACID block #3 having valid ACD, an ACD block #4 having none of data or one of "00" and "FF" as a value of an ACD_ID, and an ACD block #5 having valid ACD and having a defect occurred during reproduction (hereinafter, referred to as a defect-while-reproduction). The ACD_ID having the value "00" or "FF" indicates that although data has been recorded in an ACD block, ACD can be recorded in the ACD block afterwards since the data in the ACD block is not valid.

FIG. 14B illustrates state information regarding the ACD blocks #1 through 5 shown in FIG. 14A. Referring to FIG. 14B, bits "11" are recorded as ACD block #1 state information to indicate that the ACD block #1 has valid ACD. Bits "01" are recorded as ACD block #2 state information to indicate that the ACD block #2 is defective. Bits "11" are recorded as ACD block #3 state information to indicate that the ACD block #3 has valid ACD. Bits "00" are recorded as ACD block #4 state information to indicate that the ACD block #4 is available for recording ACD because the ACD block #4 has no data recorded therein or has invalid data. Bits "10" are recorded as ACD block #5 state information to indicate that the ACD block #5 has valid ACD and a defect-while-reproduction.

The ACD blocks and the ACD state information shown in FIGS. 14A and 14B are changed by reinitialization of a disc, as shown in FIGS. 15A and 15B.

Referring to FIG. 15A, after the reinitialization, only the ACD block #2 that was defective remains in the state before the reinitialization, but other ACD blocks, i.e., valid ACD blocks, ACD blocks having "00" or "FF" as a value of the ACD_ID, and ACD block having a defect-while-reproduction, come to have "00" or FF" as a value of their ACD_ID so that the ACD blocks can be used after the reinitialization. An unrecorded block having no data before the reinitialization remains as it is even after the reinitialization.

FIG. 15B illustrates state information regarding the ACD blocks #1 through 5 shown in FIG. 15A. Referring to FIG. 15B, the bits of the ACD block #1 state information, the ACD block #3 state information, and the ACD block #4 state information are changed into "00" to indicate that the ACD blocks #1, 3, and 4 are available for recording the ACD because the ACD blocks #1, 3, and 4 have no data recorded therein or have invalid data. The bits "01" indicating that the ACD block #2 is defective remain as the ACD block #2 state information. The bits of the ACD block #5 state information are changed into "01" since the ACD block #5 has a defect-while-reproduction. When an ACD block has a defect-while-reproduction, the ACD blocks ACD_ID has a value "00h" or "FFh" indicating that the ACD block is available for recording and state information regarding the ACD block is expressed with bits "01" indicating a defective block. In this situation, when an ACD_ID of an ACD block is inconsistent with the state information regarding the ACD block, the ACD block is not available because of defectiveness since the state information is considered prior to the ACD_ID. However, when the state information cannot be extracted due to an error while state information is reproduced, the ACD block having "00h" or "FFh" as its ACD_ID is available.

In the above-described arrangement, a state denoted by an ACD_ID of ACD contained in an ACD block within the ACA on a disc may be inconsistent with a state denoted by corresponding ACD block state information recorded in the DDS on the disc. In this case, a drive system is designed to primarily rely on the ACD block state information recorded in the DDS. This will be described in detail below.

A state of an ACD block can be known from corresponding ACD block state information recorded in the DDS and the ACD block's ACD_ID recorded in the ACA. If these two types of information are inconsistent with each other, a drive system primarily relies on the ACD block state information recorded in the DDS. When data cannot be reproduced from the DDS within the DMA due to, for example, a defect occurring in the DMA, the drive system determines validity of information contained in the ACD block, based on the ACD_ID recorded in the ACA. Inconsistencies between the two types of information may occur due to a defect occurring during recording. For example, when a valid ACD is recorded in an ACD block A, a state of the ACD block A is recorded as "11" in the DDS. Thereafter, if a defect occurs when an updated ACD is written to the ACD block A in response to a request to update the ACD block A, the drive system records the state information regarding the ACD block A as indicating a defective block. However, the update ACD has not been written to the ACD block A due to the defect during the recording, and the ACD block A still has the valid ACD. As a result, the ACD_ID of the valid ACD remains in the ACD block A within the ACA. In this case, the ACD block state information must be primarily referred to in order to prevent an erroneous operation of a system.

However, when the ACD block state information in the DDS comes to be unreliable due to a failure in error correction occurring while data is reproduced from the DDS, it is preferable, but not required, that the validity of a corresponding ACD block be determined based on an ACD_ID of ACD contained in the ACD block within the ACA.

FIG. 16 is a flowchart of a reinitialization method according to another embodiment of the present invention. Referring to FIG. 11, in operation 1610, the disc 100 that has been used is loaded into a drive system. Then, the system controller 10 included in the drive system recognizes DMA information and information prescribing operations that the drive system has to perform with respect to a function that the system controller 10 knows and a function that the system controller 10 does not know (i.e., the ACD recorded on the disc 100). Next, in operation 1620, the system controller 10 receives a reinitialization command from the host 3 through the host I/F 20.

In operation 1630, the system controller 10 controls the writing/reading unit 2 to read information recorded in the DMA and the ACA, which are included in a lead-in area of the disc 100, and brings the information. By way of example, the information recorded in the DMA may be a write protection flag, and the information recorded in the ACA may be information regarding recordability or formatability, which is included in common information of ACD.

In operation 1640, the system controller 10 determines whether the information read from the DMA and the ACA permits reinitialization. For example, if the write protection flag read from the DMA has a value "1", writing to the disc 100 is prohibited, and thus reinitialization cannot be performed. The common information of the ACD recorded in the ACA includes formatability information and recordability/reproducibility information regarding sub-areas of the disc 100. If the formatability information and the recordability/reproducibility information do not permit formatting of the disc 100 or writing to any of the sub-areas of the disc 100, reinitialization cannot be performed. Accordingly, the system controller 10 determines whether the disc 100 is writable based on the information read from the DMA and the ACA.

If the write protection flag is set to "1" or if the common information of the ACD does not permit formatting or writing, the system controller 10 determines that the disc 100 cannot be reinitialized and transmits an error message to the host 3 through the host I/F 20 in operation 1680. However, if the write protection flag is not set to "1" and the common information of the ACD permits formatting and writing, the system controller 10 determines to reinitialize the disc 100 and starts reinitializing the disc 100.

Meanwhile, when ACD regarding functions that can be recognized by the drive system has values that do not permit reinitialization and ACD regarding functions that cannot be recognized by the drive system has values permitting reinitialization, the values of the ACD regarding the recognizable functions may be changed into values permitting reinitialization in response to the user's request for reinitialization since the values of the ACD regarding the recognizable functions can be updated, and then it may be determined to start reinitialization of the disc 100.

If reinitialization is permitted, the system controller 10 assigns a spare area in a data area of the disc 100 to determine a size of the spare area and assigns the UDA for recording user data in the data area to determine a start address and an end address of the UDA in operation 1650. In operation 1660, the system controller 10 controls the writing/reading unit 2 to clear the ACA included in the lead-in area on the disc 100 and updates ACD state information. In detail, when clearing the ACA, the system controller 10 maintains ACD block state information only when a corresponding ACD block is defective and fills the other ACD blocks within the ACA with "00h" or "FFh" or changes an ACD_ID of each of the other ACD blocks into "00h" or "FFh" in order to indicate that the other ACD blocks are available. In addition, the system controller 10 updates the ACD state information, as described with reference to FIGS. 14A through 15B, to reflect changed states of the ACD blocks.

In operation 1670, the system controller 10 controls the writing/reading unit 2 to clear the DMA included in the lead-in area on the disc 100 and controls the writing/reading unit 2 and the servo 50 to record in the DMA an initial DFL and a DDS including the determined information (i.e., spare area assignment information and UDA assignment information), and the updated ACD state information. Although it has been described that initialization information is recorded in the DMA after being cleared, actually, the initialization information recorded in the DMA is updated the since the disc 100 is a rewritable type. Although not shown in FIG. 16, file system information recorded in a predetermined portion of the UDA to manage data recorded in the UDA should be cleared.

Hereinafter, a default ACD will be described. The ACD may be divided into recognizable ACD and unrecognizable ACD according to whether a drive system supports the ACD (i.e., whether the drive system can recognize a function corresponding to the ACD). The recognizable ACD includes the default ACD which all drive systems supporting ACD must support. Such a default ACD may be recorded in the ACA during initialization or reinitialization of a disc and can be utilized efficiently. As compared to an ACD for a predetermined function (such as write protection or reproduction protection), the default ACD contains initialization information used to access the information storage medium when the information storage medium is initialized or reinitialized.

Figure 17:
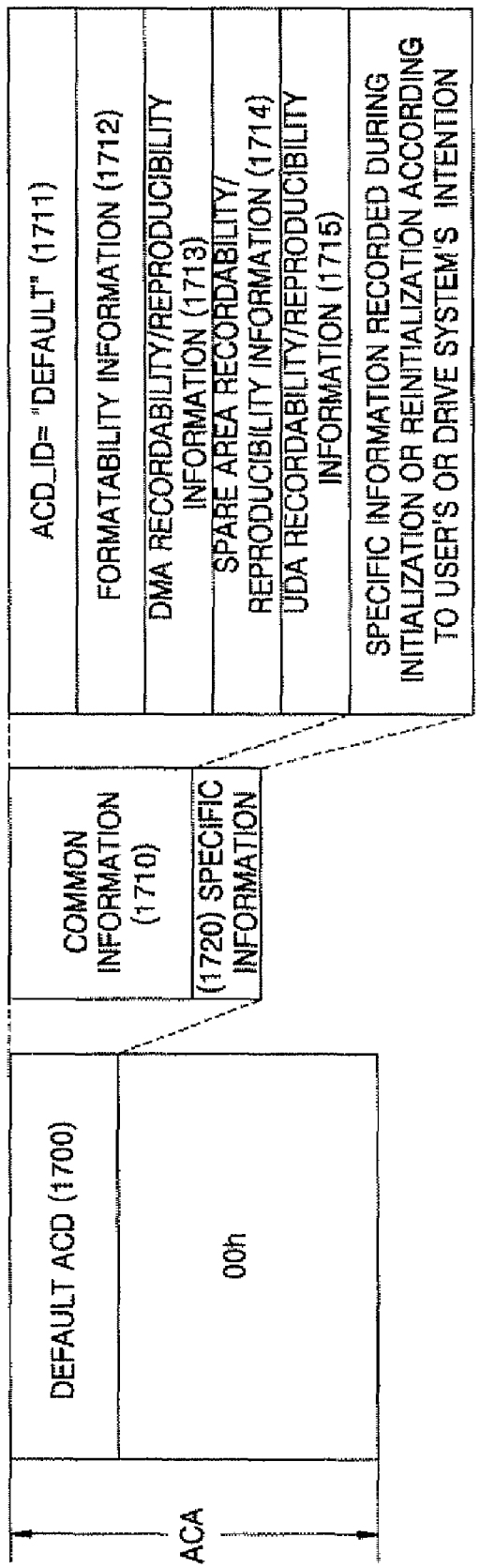
FIG. 17 illustrates a structure of a default ACD according to an aspect of the present invention.

FIG. 17 illustrates a structure of the default ACD according to an aspect of the present invention. Referring to FIG. 17, default ACD 1700 is recorded in a portion of an ACA. The default ACD 1700 has a default property and the same structure as normal ACD. The default ACD 1700 includes common information 1710 and specific information 1720.

An ACD_ID 1711 is included in the common information 1710 and is recorded as "DEFAULT" to indicate the default ACD. Other information (i.e., formatability information 1712, DMA recordability/reproducibility information 1713, spare area recordability/reproducibility information 1714, and UDA recordability/reproducibility information 1715) are set to zero (0) to permit free use of sub-areas defined on a disc. The common information 1710 is substantially similar to the common information for the ACD having the predetermined function.

The specific information 1720 may be recorded during initialization or reinitialization according to a user's or a drive system's intention. The specific information 1720 is regarding the disk information, whereas the specific information for an ACD having a specific function is about the predetermined function such as write protection or reproduction protection. The specific information 1720 may include a drive ID and a recording date. The drive ID can be provided from a drive system, and the recording data can be provided from a host. When the recording date and the drive ID are included in the specific information 1720 of the default ACD 1700, when the disc is initialized by what drive system can be easily known. However, other types of information may be included in the specific information 1720 according to a user or a drive system's intention.

Figure 18:
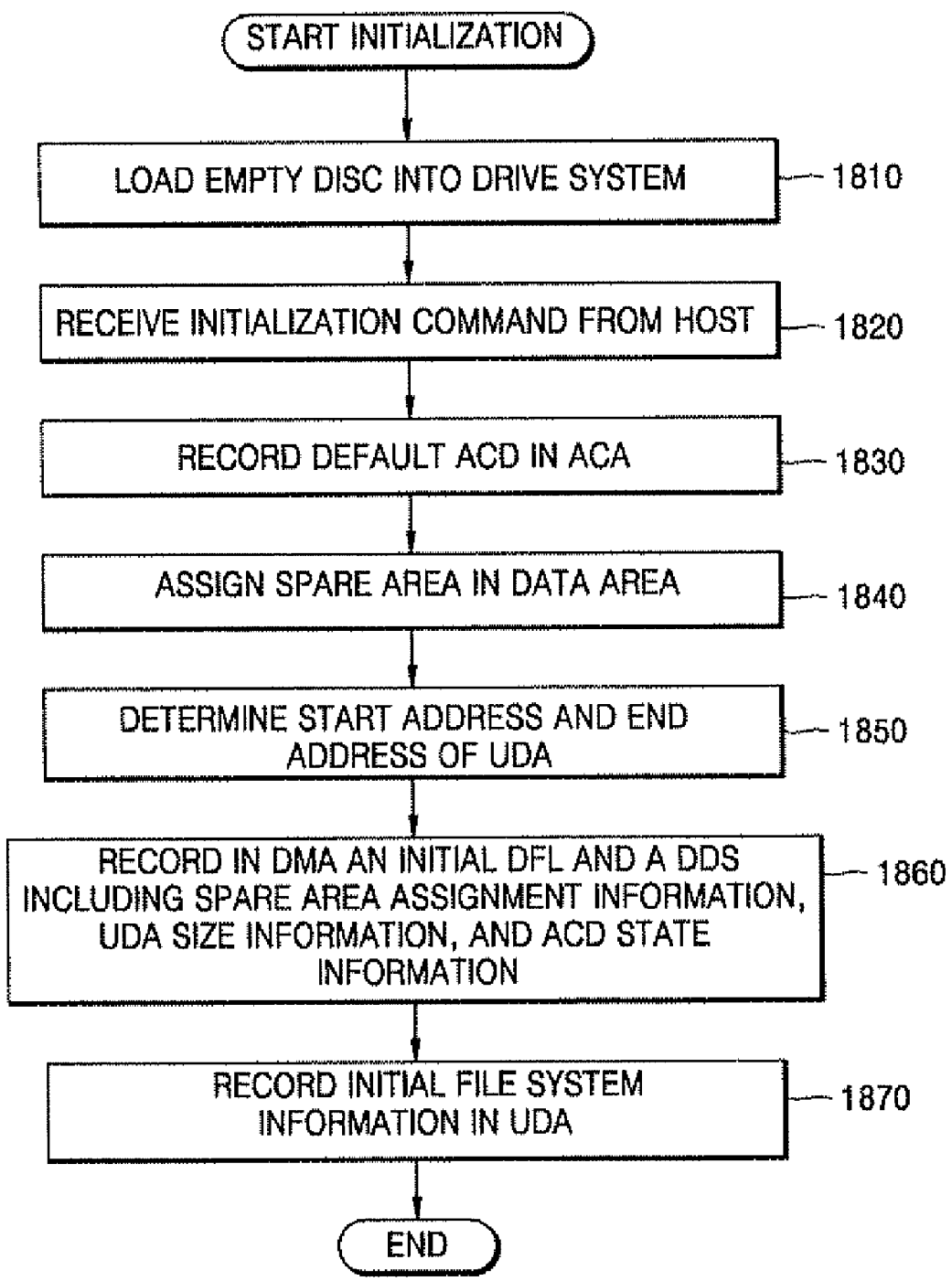
FIG. 18 is a flowchart of an initialization method for a rewritable recording medium according to an embodiment of the present invention.

FIG. 18 is a flowchart of an initialization method for a rewritable recording medium according to an embodiment of the present invention. Referring to FIG. 18, in operation 1810, an empty disc is loaded into a drive system. In operation 1820, the drive system receives an initialization command from a host according to a user's request to initialize the disc. In operation 1830, the drive system records the default ACD in the ACA on the disc in response to the initialization command. The recording of the default ACD may be automatically performed by a system controller included in the drive system or may be performed by recording information that is provided by the host to set the default ACID in response to a write command. Alternatively, the two methods may be combined. It is preferable, but not required, that all recordability/reproducibility information included in common information in the default ACD are set to zero (0) to indicate that the disc is recordable/reproducible. Specific information included in the default ACD may be set to proper values according to a user's or a drive system's intention.

In operation 1840, a spare area is assigned in a data area on the disc to replace a defective block during defect management. In operation 1850, a start address and an end address of a UDA are determined in the data area. In operation 1860, an initial DFL and a DDS including spare area assignment information, UDA size information, and ACD state information after the default ACD is recorded are recorded in a DMA on the disc. Since only the default ACD is recorded in the ACA, the ACD state information may include ACD block state information indicating that an ACD block corresponding to the default ACD has valid ACD and ACD block state information indicating that the other ACD blocks within the ACA are available.

In operation 1870, initial file system information for managing data to be recorded in the UDA is recorded in the UDA in response to a write command from the host. Operation 1870 may be performed in any of the previous operations.

Figure 19:
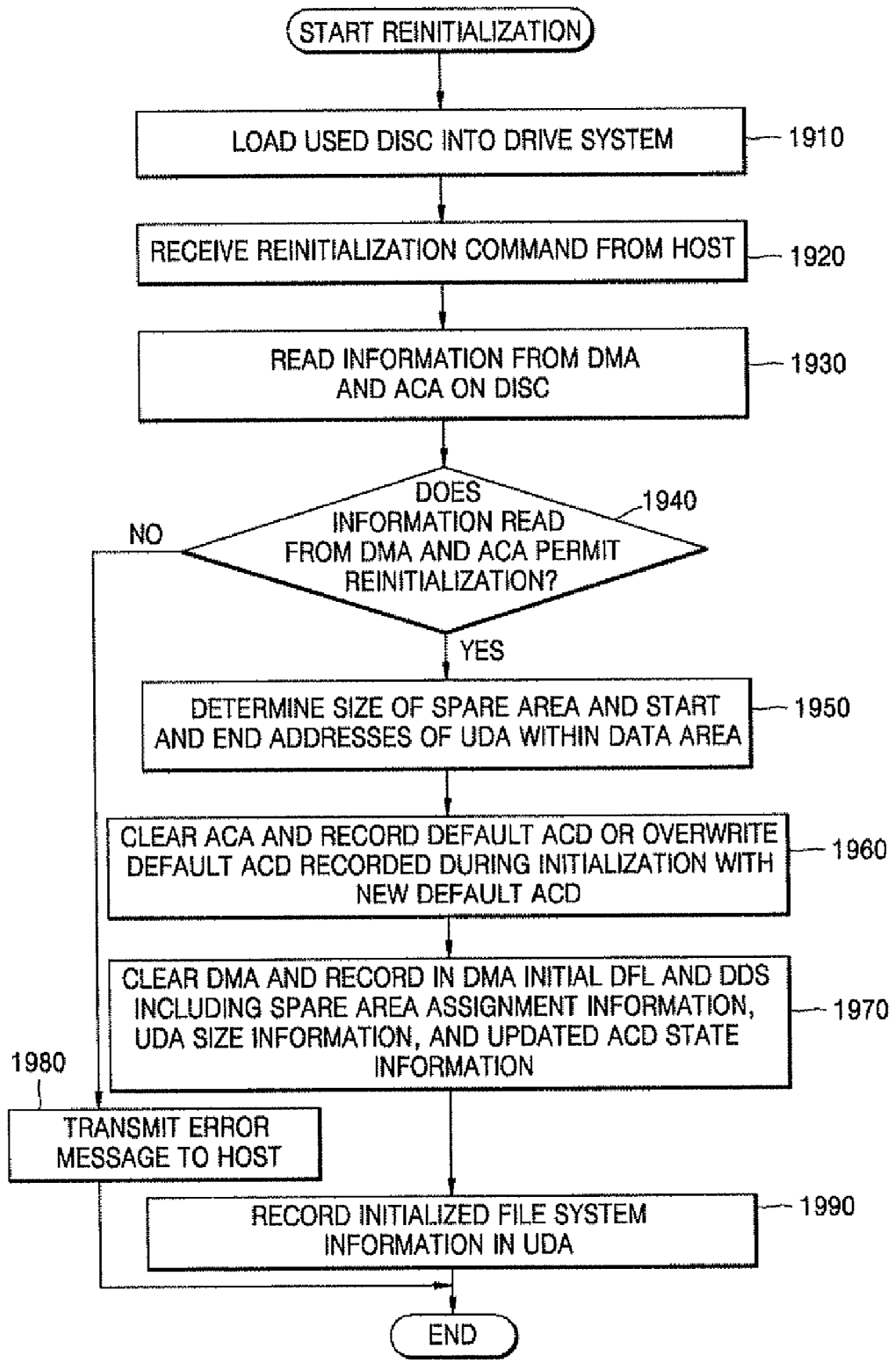
FIG. 19 is a flowchart of a reinitialization method for a rewritable recording medium according to an embodiment of the present invention.

FIG. 19 is a flowchart of a reinitialization method for a rewritable recording medium according to an embodiment of the present invention. Referring to FIG. 11, in operation 1910, the disc 100 that has been used is loaded into a drive system. In operation 1920, the system controller 10 included in the drive system receives a reinitialization command from the host 3 through the host I/F 20. In operation 1930, the system controller 10 controls the writing/reading unit 2 to read information recorded in a DMA and an ACA, which are included in a lead-in area of the disc 100, and brings the information. In operation 1940, the system controller 10 whether the information read from the DMA and the ACA permits reinitialization.

If it is determined that the information does not permit reinitialization, the system controller transmits an error message to the host 3 through the host I/F 20 in operation 1980. However, if it is determined that the information permits reinitialization, in operation 1950, the system controller 10 assigns a spare area in a data area on the disc 100 to determine a size of the spare area and assigns a UDA for recording user data in the data area to determine a start address and an end address of the UDA.

In operation 1960, the system controller 10 controls the writing/reading unit 2 to clear the ACA included in the lead-in area on the disc 100 and records default ACD or overwrites default ACD recorded during initialization with new default ACD. Here, the system controller 10 may or may not clear all ACD blocks in the ACA before recording the default ACD. Since the default ACD is recorded during initialization and values included in the default ACD are set appropriately according to a user's intention while the disc 100 is used, the default ACD recorded before the reinitialization may be overwritten with values appropriately set according to a user's intention to reinitialize the disc 100. It is preferable, but not required, that all recordability/reproducibility information included in common information in the default ACD are set to zero (0) to indicate that the disc 100 is recordable/reproducible. In addition, specific information included in the default ACD may be set to proper values according to the user's or a drive system's intention.

In operation 1970, the system controller 10 controls the writing/reading unit 2 to clear the DMA in the lead-in area and controls the writing/reading unit 2 and the servo 50 to record an initial DFL and a DDS including spare area assignment information, UDA size information, and updated ACD state information in the DMA.

In operation 1990, the system controller 10 reinitializes file system information, which has been recorded in the UDA to reinitialize information for managing data recorded in the UDA, in response to a write command from the host 3.

Figure 20:
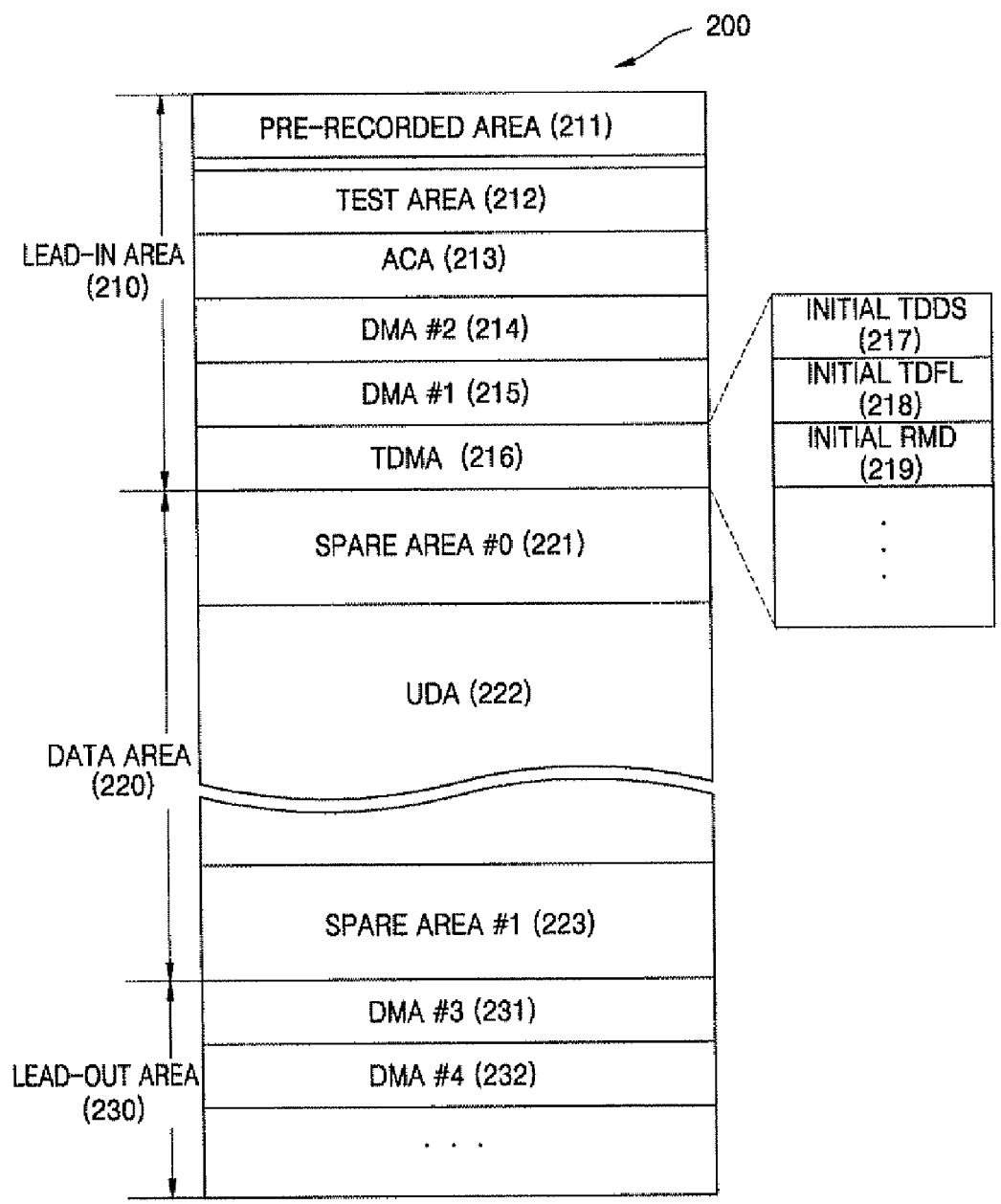
FIG. 20 illustrates a structure of a write-once recording medium according to an embodiment of the present invention.

FIG. 20 illustrates a structure of a write-once recording medium 200 according to an embodiment of the present invention. Referring to FIG. 20, the write-once recording medium 200 includes a lead-in area 210, a data area 220, and a lead-out area 230. The lead-in area 210 includes a pre-recorded area 211, a test area 212, an ACA 213, a DMA #1 215, a DMA #2 214, and a temporary DMA (TDMA) 216. The data area 220 includes a spare area #0 221, a UDA 222, a spare area #1 223. The lead-out area 230 includes a DMA #3 231 and a DMA #4 232.

The write-once recording medium 200 has substantially the same structure as the disc 100 shown in FIG. 3, with the exception that the write-once recording medium 200 further includes the TDMA 216. A temporary DDS (TDDS), a temporary DFL (TDFL), and recording management data (RMD) are recorded in the TDMA 216. During initialization, as shown in FIG. 20, the TDMA 216 includes an initial TDDS 217 containing spare area assignment information, UDA size information, and ACD state information; an initial TDFL 218 containing initial defect management information; and initial RMD 219 containing initial recording management information.

Figure 21:
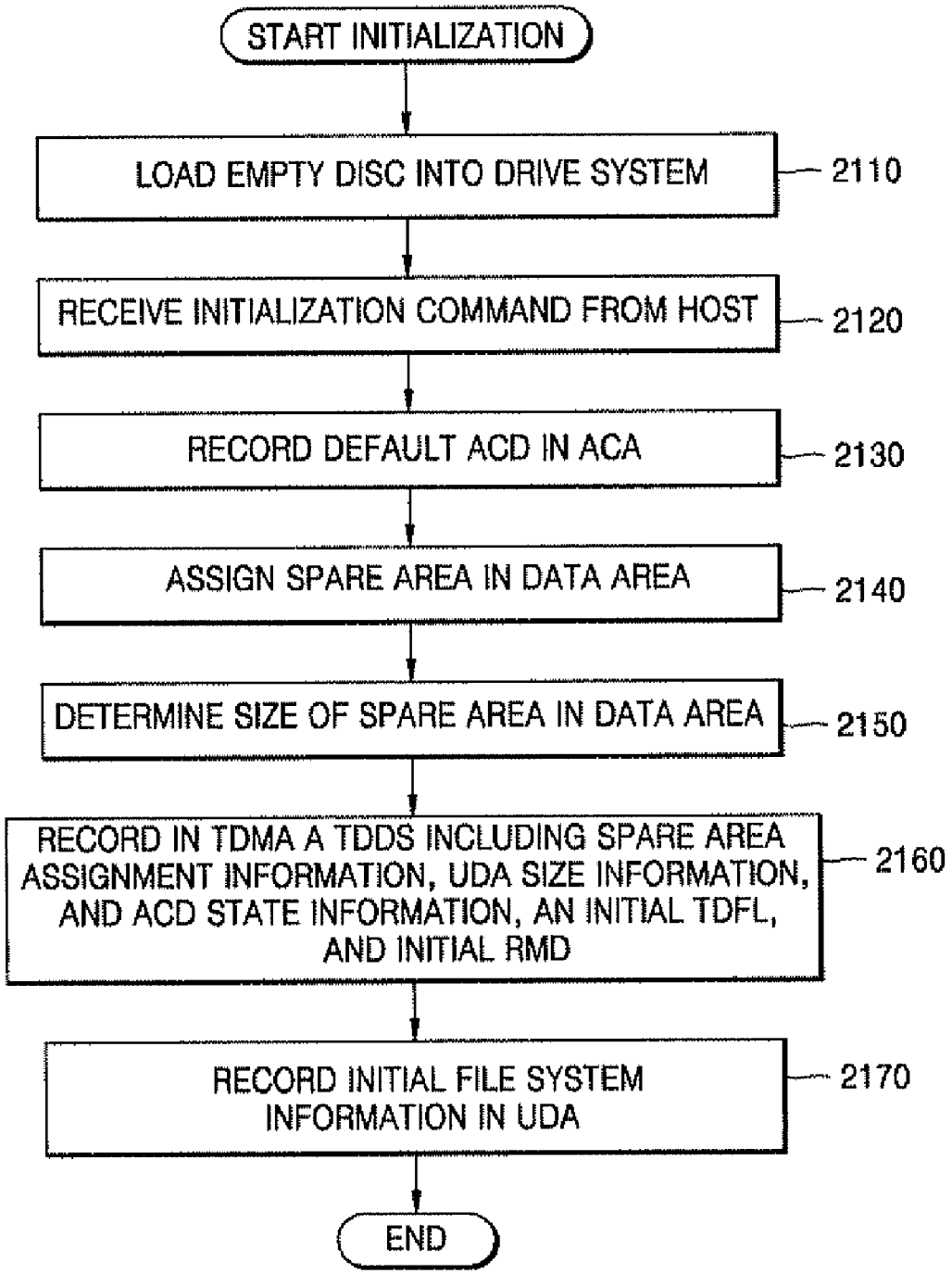
FIG. 21 is a flowchart of an initialization method for a write-once recording medium according to an embodiment of the present invention.

FIG. 21 is a flowchart of an initialization method for a write-once recording medium according to an embodiment of the present invention. Referring to FIG. 21, in operation 2110, an empty and write-once disc is loaded into a drive system. In operation 2120, the drive system receives an initialization command from a host according to a user's request to initialize the disc.

In operation 2130, the drive system records the default ACD in the ACA on the disc in response to the initialization command. The recording of the default ACD may be automatically performed by a system controller included in the drive system or may be performed by recording information that is provided by the host to set the default ACD in response to a write command. Alternatively, the two methods may be combined. It is preferable, but not required, that all recordability/reproducibility information included in common information in the default ACD are set to zero (0) to indicate that the disc is recordable/reproducible. Specific information included in the default ACD may be set to proper values according to a user's or a drive system's intention.

In operation 2140, a spare area is assigned in a data area on the disc to replace a defective block during defect management. In operation 2150, a start address and an end address of a UDA are determined in the data area. In operation 2160, a TDDS including spare area assignment information, UDA size information, and ACD state information after the default ACD is recorded, an initial TDFL, and initial RMD are recorded in a TDMA on the disc. Since only the default ACD is recorded in the ACA, the ACD state information may include ACD block state information indicating that an ACD block corresponding to the default ACD has valid ACD and ACD block state information indicating that the other ACD blocks within the ACA are available.

In operation 2170, initial file system information for managing data to be recorded in the UDA is recorded in the UDA in response to a write command from the host. Operation 2170 may be performed in any of the previous operations.

Figure 22:
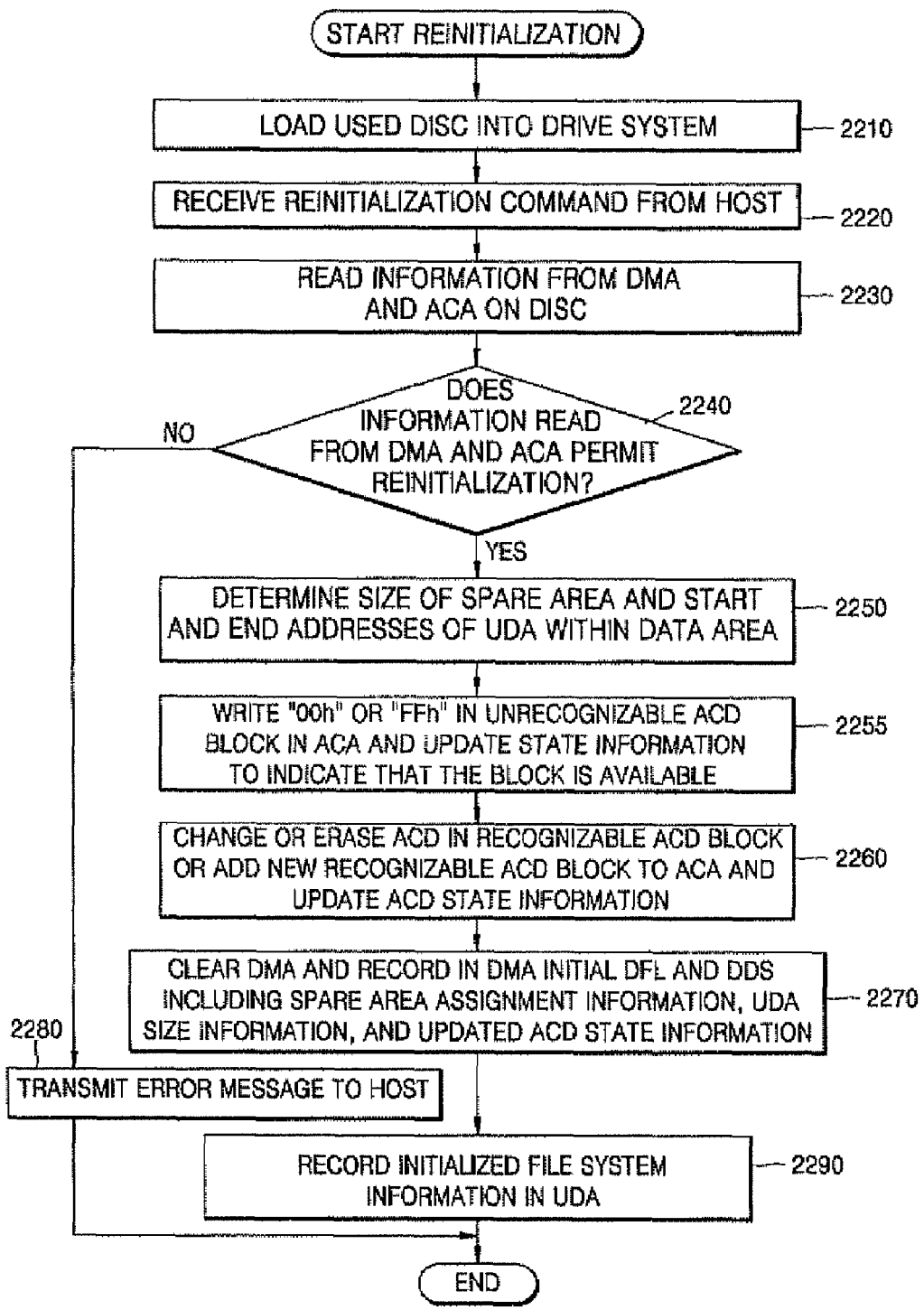
FIG. 22 is a flowchart of a reinitialization method for a rewritable recording medium according to an embodiment of the present invention.

FIG. 22 is a flowchart of a reinitialization method for a rewritable recording medium according to an embodiment of the present invention. Referring to FIG. 22, in operation 2210, the disc 100 that has been used is loaded into a drive system. In operation 2220, the system controller 10 included in the drive system receives a reinitialization command from the host 3 through the host I/F 20. In operation 2230, the system controller 10 controls the writing/reading unit 2 to read information recorded in a DMA and an ACA, which are included in a lead-in area of the disc 100, and brings the information. In operation 2240, the system controller 10 whether the information read from the DMA and the ACA permits reinitialization.

If it is determined that the information does not permit reinitialization, the system controller transmits an error message to the host 3 through the host I/F 20 in operation 2280. However, if it is determined that the information permits reinitialization, in operation 2250, the system controller 10 assigns a spare area in a data area on the disc 100 to determine a size of the spare area and assigns a UDA for recording user data in the data area to determine a start address and an end address of the UDA.

In operation 2255, the system controller 10 writes "00h" or "FFh" in an unrecognizable ACD block in the ACA automatically or in response to a command from the host 3, and updates state information regarding the unrecognizable ACD block to indicate that the unrecognizable ACD block can be used by the drive system automatically or in response to a command from the host 3. Since the unrecognizable ACD relates to a function that a user, a drive system, or an application does not know, details of the unrecognizable ACD cannot be known. If such unrecognizable ACD is not erased during reinitialization of a disc, inconvenience may be caused during use of the reinitialized disc. For example, if the ACD regarding a read protection function has been recorded and is not erased from a disc during reinitialization by a drive system and an application that does not recognize the read protection function, data recorded on the disc cannot be read during reproduction after the reinitialization since the disc still has the read protection. In other words, when a current user uses a disc without knowing that the disc has the read protection set by a previous user, the current user cannot efficiently use the disc. Fundamentally, ACD recorded on a disc by a drive system including an application that recognizes the ACD includes common information according to which even a drive system including an application that cannot recognize the ACD can use the disc. Accordingly, it is preferable that the ACD is not changed or erased during use of the disc. However, since reinitialization is performed by a user to totally renew and reuse the disc, a function of unrecognizable ACD is useless to the user.

In operation 2260, the system controller 10 changes or erases ACD contained in a recognizable ACD block or adds a new ACD block to the ACA according to the user's request and updates ACD state information. Recognizable ACD relates to a function known to the user, the drive system, or the application. Accordingly, change, erasure, or addition can be performed with respect to the recognizable ACD block according to the user's request through special user interface. According to the change, erasure, or addition, ACD state information included in a DDS is properly updated. Such recognizable ACD may include default ACD described in the embodiments illustrated in FIGS. 18 and 19.

Thereafter, in operation 2270, the system controller 10 controls the writing/reading unit 2 to clear the DMA in the lead-in area and controls the writing/reading unit 2 and the servo 50 to record in the DMA an initial DFL and a DDS including spare area assignment information, UDA size information, and updated ACD state information.

In operation 2290, the system controller 10 reinitializes file system information, which has been recorded in the UDA to reinitialize information for managing data recorded in the UDA, in response to a write command from the host 3.

While not required in all aspects, aspects of the invention can also be embodied as computer readable codes on one or more computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to aspects of the present invention, common information regarding disc access control, which is recognizable by all standards of a drive system, is recorded on a disc when the disc is initialized or reinitialized so that even a drive system that cannot recognize a function adapted to the disc can properly operate based on the common information, thereby increasing compatibility between discs and drive systems.

While aspects of the invention has been particularly shown and described with reference to embodiments thereof, it will be understood by those skilled in the art that various changes in form and details may be made therein without departing from the spirit and scope of the invention as defined by the accompanying claims and equivalents thereof. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A recording/reproducing apparatus which transfers data with respect to an information recording medium, the apparatus comprising:
    a writing/reading unit writing data to or reading data from the information recording medium having an access control area including access control data (ACD), and an ACD state information area including state information selectable between and indicating one of defectiveness and recordability of a corresponding ACD block containing the ACD, the ACD having common information for a corresponding predetermined function recognized by a compliant type of recording and/or reproducing apparatus and which is set to allow a non-compliant type of recording/reproducing apparatus that cannot recognize the predetermined function adapted to the information recording medium to control access to the information recording medium; and
    a control unit controlling the writing/reading unit to change the state information regarding the ACD block when the information recording medium is reinitialized.

2. The recording/reproducing apparatus of claim 1, wherein the control unit changes state information indicating that the corresponding ACD block has valid ACD into state information indicating that the ACD block has invalid ACD and is available for recording of ACD when the information recording medium is reinitialized.

3. The recording/reproducing apparatus of claim 1, wherein the control unit does not change state information indicating that the ACD block is a defective block and state information indicating that the ACD block is available for recording of ACD when the information recording medium is reinitialized.

4. The recording/reproducing apparatus of claim 1, wherein the control unit changes state information indicating that the ACD block has valid ACD and a defect-while-reproduction into state information indicating that the ACD block is a defective block when the information recording medium is reinitialized.

5. The recording/reproducing apparatus of claim 1, wherein the control unit controls the writing/reading unit to write one of "00h" and "FFh" as an ID of the ACD to indicate validity of the ACD block included in the access control area when the information recording medium is reinitialized.

6. The recording/reproducing apparatus of claim 5, wherein the control unit controls the writing/reading unit to read data from the ACD block based on the state information regarding the ACD block when the validity of the ACD block indicated by the ID of the ACD is inconsistent with the state information regarding the ACD block.

7. The recording/reproducing apparatus of claim 5, wherein when an error occurs while the state information regarding the ACD block is reproduced, the control unit determines the validity of the ACD block based on the ID of the ACD.

8. A recording/reproducing method comprising:
    writing data to or reading data from an information recording medium having an access control area, having access control data (ACD), and an ACD state information area having state information selectable between and indicating one of defectiveness and recordability of an ACD block containing the ACD, the ACD having common information for a corresponding predetermined function recognized by a compliant type of recording and/or reproducing apparatus and which is set to allow a non compliant type of recording/reproducing apparatus that cannot recognize a predetermined function adapted to the information recording medium to control access to the information recording medium; and
    changing the state information regarding the ACD block when the information recording medium is reinitialized.

9. The recording/reproducing method of claim 8, wherein the changing of the state information comprises changing state information indicating that a corresponding ACD block has valid ACD into state information indicating that the ACD block has invalid ACD and is available for recording of ACD.

10. The recording/reproducing method of claim 8, wherein the changing of the state information comprises maintaining state information indicating that the ACD block is defective block and state information indicating that the ACD block is available for recording of ACD.

11. The recording/reproducing method of claim 8, wherein the changing of the state information comprises changing state information indicating that the ACD block has valid ACD and a defect-while-reproduction into state information indicating that the ACD block is a defective block.

12. The recording/reproducing method of claim 8, further comprising recording one of "00h" and "FFh" as an ID of the ACD to indicate validity of the ACD block included in the access control area when the information recording medium is reinitialized.

13. The recording/reproducing method of claim 12, further comprising reading data from the ACD block based on the state information regarding the ACD block when the validity of the ACD block indicated by the ID of the ACD is inconsistent with the state information regarding the ACD block.

14. The recording/reproducing method of claim 12, further comprising determining the validity of the ACD block based on the ID of the ACD and reading data from the ACD block based on a result of the determination, when an error occurs while the state information regarding the ACD block is reproduced.

15. A computer readable medium encoded with instructions for implementing the method of claim 8 implemented by a computer.

* * * * *